(12) United States Patent
Miyazaki

(10) Patent No.: US 9,036,738 B2
(45) Date of Patent: May 19, 2015

(54) RECEIVING DEVICE AND RECEIVING METHOD

(71) Applicant: FUJITSU LIMITED, Kawasaki-shi, Kanagawa (JP)

(72) Inventor: Shunji Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/226,468

(22) Filed: Mar. 26, 2014

(65) Prior Publication Data

US 2014/0301505 A1 Oct. 9, 2014

(30) Foreign Application Priority Data

Apr. 4, 2013 (JP) .................................. 2013-078179

(51) Int. Cl.
*H03D 1/24* (2006.01)
*H04L 25/06* (2006.01)
*H04L 1/00* (2006.01)

(52) U.S. Cl.
CPC ............ *H04L 25/067* (2013.01); *H04L 1/0055* (2013.01)

(58) Field of Classification Search
CPC ..... H04L 25/067; H04L 1/0055; H04L 25/00; H04L 27/06; H04L 27/38; H04L 27/3809; H04L 27/3827
USPC ......... 375/320, 324, 340, 341, 261, 262, 264, 375/268, 148, 150, 147
See application file for complete search history.

(56) References Cited

U.S. PATENT DOCUMENTS

2006/0056496 A1* 3/2006 Smee et al. .................. 375/148
2007/0047629 A1* 3/2007 Fulghum ...................... 375/148

FOREIGN PATENT DOCUMENTS

JP 2005-521269 A 7/2005
WO WO 03/003586 A2 1/2003

OTHER PUBLICATIONS

Pietrobon et al., "Implementation and Performance of a Turbo/MAP Decoder," http://www.itr.unisa.edu.au/~steven/turbo/turboMAP.ps.gz, confirmed by the inventor on Aug. 29, 2012, pp. 1-45.

* cited by examiner

*Primary Examiner* — Phuong Phu
(74) *Attorney, Agent, or Firm* — Arent Fox LLP

(57) ABSTRACT

A receiving device including: a demodulation circuit configured to generate first likelihood data of reception symbols based on a transmission format of the reception symbols, the transmission format being selected from transmission formats and including a modulation scheme applied to the reception symbols, the modulation scheme being one of amplitude modulation schemes, a processor configured to estimate a scale ratio of an implementation scale to a theoretical scale, the implementation scale being a scale of the first likelihood data, the theoretical scale being a scale of second likelihood data of the reception symbols, the second likelihood data being defined by a theory and not depending on an implementation of the receiving device, and to generate the second likelihood data based on the first likelihood data and the scale ratio, and a decoding circuit configured to decode the second likelihood data based on the transmission format.

10 Claims, 22 Drawing Sheets

FIG. 4

| ITEM | | PARAMETER |
|---|---|---|
| INFORMATION BIT SIZE | | K, VARIABLE FROM 40 TO 6144 |
| CODE BIT SIZE | | N=3*K+12 |
| CODE RATE (NOMINAL RATE IF NOT INCLUDING END 12 BITS) | | 1/3 |
| CODE RATE (INCLUDING END) | | K/(3*K+12) |
| CONSTITUENT CODE | | POLYNOMIAL EXPRESSION FOR GENERATED 1/2-RECURSIVE CONVOLUTION CODE $G(D)=[1,g_1(D)/g_0(D)]$ WHERE $g_0(D)=1+D^2+D^3$ $g_1(D)=1+D^2+D^3$ |
| | DELAY MEMORY SIZE | m=3 |
| | CONSTRAINT LENGTH | L=m+1 |
| | TRELLIS BOUNDARY CONDITIONS — START | STATE 0 |
| | TRELLIS BOUNDARY CONDITIONS — END | STATE 0 |
| | INTERLEAVER(IL) | QUADRATIC POLYNOMIAL PERMUTATION (QPP) |

FIG. 5

| MCS INDEX | MODULATION FORMAT | MODULATION FORMAT | TABLE VALUE |
|---|---|---|---|
| 0 | QPSK | 0.09 | T(0) |
| 1 | QPSK | 0.12 | T(1) |
| 2 | QPSK | 0.15 | T(2) |
| 3 | QPSK | 0.19 | T(3) |
| 4 | QPSK | 0.24 | T(4) |
| 5 | QPSK | 0.29 | T(5) |
| 6 | QPSK | 0.35 | T(6) |
| 7 | QPSK | 0.41 | T(7) |
| 8 | QPSK | 0.47 | T(8) |
| 9 | QPSK | 0.53 | T(9) |
| 10 | 16QAM | 0.27 | T(10) |
| 11 | 16QAM | 0.29 | T(11) |
| 12 | 16QAM | 0.33 | T(12) |
| 13 | 16QAM | 0.38 | T(13) |
| 14 | 16QAM | 0.43 | T(14) |
| 15 | 16QAM | 0.47 | T(15) |
| 16 | 16QAM | 0.51 | T(16) |
| 17 | 64QAM | 0.34 | T(17) |
| 18 | 64QAM | 0.37 | T(18) |
| 19 | 64QAM | 0.41 | T(19) |
| 20 | 64QAM | 0.44 | T(20) |
| 21 | 64QAM | 0.49 | T(21) |
| 22 | 64QAM | 0.52 | T(22) |
| 23 | 64QAM | 0.57 | T(23) |
| 24 | 64QAM | 0.61 | T(24) |
| 25 | 64QAM | 0.64 | T(25) |
| 26 | 64QAM | 0.69 | T(26) |
| 27 | 64QAM | 0.71 | T(27) |
| 28 | 64QAM | 0.84 | T(28) |

RECEIVING DEVICE AND RECEIVING METHOD

CROSS-REFERENCE TO RELATED APPLICATION

This application is based upon and claims the benefit of priority of the prior Japanese Patent Application No. 2013-078179, filed on Apr. 4, 2013, the entire contents of which are incorporated herein by reference.

FIELD

The embodiments discussed herein are related to a receiving device and a receiving method in wireless communication systems.

BACKGROUND

A transmitting device and receiving device in a wireless communication system may transmit and receive information bits over a (communication) channel, by each executing processing such as described below with reference to FIG. 1. FIG. 1 is an exemplary diagram of a wireless communication system. The wireless communication system 1 includes a transmitting device 2 and a receiving device 3. The transmitting device 2 includes an encoding unit 21, a modulation mapping unit 22, and a transmission processing unit 23. The receiving device 3 includes a reception processing unit 31, a demodulation demapping unit 32, and a decoding unit 33.

The encoding unit 21 performs error-correction encoding of an information bit series to be transmitted, thereby generating an encoded bit series. For example, the encoding unit 21 generates an information bit series using turbo code which is defined as a data channel encoding format in Third Generation Partnership Project (3GPP).

Standard turbo code defined by the 3GPP is rate ⅓ turbo code. A turbo encoder includes two constituent encoders and an interleaver situated between the two constituent encoders. Constituent code is rate ½ recursive convolution code. The encoding unit 21 performs puncturing, where a part of parity bits output from the constituent encoders is not included in the code word. The encoding unit 21 may also execute repetition, where a part of parity bits output from the constituent decoders is repeated. Executing rate matching including puncturing and repetition enables an encoded bit series having an operational code rate to be generated in accordance with the communication quality of a communication channel 4 between the transmitting device 2 and receiving device 3.

The encoding unit 21 encodes the information bit series in increments of code blocks. We will say that the increment of data packets process each sub frame making up a wireless frame is a transport block. In a case where the size of the transport block exceeds a stipulated maximum size, the transport block is divided into multiple interleaver-size code blocks, and encoded by the encoding unit 21 in increments of code blocks.

The length of a wireless frame in Long Term Evolution (LTE) standardized under the 3GPP is 10 ms, and is made up of ten sub frames. User data of user equipment (UE) selected by scheduling of wireless resources is transmitted from an evolved Node B (eNodeB) to the UE, in increments of sub frames. The eNodeB may correspond to the transmitting device 2, and the UE may correspond to the receiving device 3. Sub frames include the Physical Downlink Control Channel (PDCCH) and Physical Downlink Shared Channel (PDSCH). The PDCCH is a channel to notify the UE selected by scheduling, of wireless allocation information. The PDSCH is a shared data channel for transmitting user data.

The modulation mapping unit 22 maps code bits to signal symbols by modulating the encoded bit series generated by the encoding unit 21 in increments of a predetermined number of bits, thereby generating a signal symbol series. Signal symbols are represented on a complex plane (signal space) as points which are different to corresponding original bit values before modulation processing.

Specifically, the modulation mapping unit 22 maps a sub block a predetermined number m from the first bit in the encoded bit series, to one signal symbol. For example, in Quadrature Phase Shift Keying (QPSK), m=2, in 16 Quadrature Amplitude Modulation (16QAM), m=4, and in 64QAM, m=6.

Signal symbols may be represented as complex numbers for the sake of convenience, with the real part and imaginary part of signal symbols represented as complex numbers being called "I channel component" and "Q channel component", respectively. If we say that the encoded bit series b is b=($b_0$, $b_1$, ... $b_{m-1}$) and the signal symbol s is s=($S_I$, $S_Q$), code bits $b_0$, $b_2$, ... $b_{m-2}$ are mapped to the I channel component $s_I$ of the signal bits. Code bits $b_1$, $b_3$, ... $b_{m-1}$ are mapped to the Q channel component $s_Q$ of the signal bits. For example, in QPSK, the I channel component $s_I$ and the Q channel component $s_Q$ each correspond to one bit of code bit. On the other hand, in 16QAM and 64QAM, the I channel component $s_I$ and the Q channel component $s_Q$ each correspond to multiple bits of code bits. Thus, 16QAM and 64QAM are also called "multilevel modulation".

The transmission processing unit 23 converts the signal symbol series generated by the modulation mapping unit 22 into carrier wave format wireless signals, and transmits the converted wireless signals to the communication channel 4.

The reception processing unit 31 receives the wireless signals transmitted from the transmitting device 2 over the communication channel 4, and performs reception processing on the received wireless signals. For example, the reception processing unit 31 performs linear amplification of the received wireless signals by auto gain control (AGC), and performs analog-to-digital (A/D) conversion of the linearly-amplified reception signals, so as to carry out synchronous detection. The reception processing unit 31 generates a reception symbol data series which may be expressed as points in signal space, by performing this reception processing on the received wireless signals, that is to say, on the received data series.

The demodulation demapping unit 32 obtains likelihood data serving as soft decision data corresponding to each bit on the information bit series transmitted from the transmitting device 2, and generates a likelihood data series (soft decision data) from the received bit series.

For example, if we assume that the communication channel 4 is an additive white Gaussian noise (AWGN) communication channel, the likelihood data may be calculated from the following expression. We will assume an average reception power $E_s$, transmission symbol series $s_i$ (i=0, 1, ..., N−1 (where N is the code bit size)), AWGN noise signal $n_i$, and variance $\sigma^2$ of the noise signal $n_i$. The reception signal series $r_i$ is expressed by the following Expression (1).

$$r_i = \sqrt{E_s} s_i + n_i \qquad (1)$$

The mean square of the noise signal $n_i$ is expressed by Expression (2), and the mean square of the transmission symbol series $s_i$ is expressed by Expression (3).

$$\langle |n_i|^2 \rangle = 2\sigma^2 = N_0 \tag{2}$$

$$\langle |s_i|^2 \rangle = 1 \tag{3}$$

The transition probability $P(r_x|s_x)$ (where X represents I channel component and Q channel component) from transmission symbol $s_x$ to reception symbol $r_x$ on the AWGN communication channel is expressed by the following Expression (4).

$$P(r_X|s_X) = \frac{1}{\sqrt{2\pi\sigma^2}} \exp\left(-\frac{1}{2\sigma^2}\left(r_X - \sqrt{E_s}\, s_X\right)^2\right) \tag{4}$$

A likelihood data series $y_i$ is $y_0, y_1, \ldots y_{m-1}$, corresponding to the encoded bit series $b_0, b_1, \ldots, b_{m-1}$ to be mapped to the transmission symbol $s_i$. If we say that a code bit b, which is a transmission bit is 0 or 1, the likelihood data $y_i$ is defined by the following Expression (5) as a log-likelihood ratio.

$$y_i = \ln\left(\frac{P(b_i = 0 | r_X)}{P(b_i = 1 | r_X)}\right) \tag{5}$$

Applying the transition probability $P(r_x|s_x)$ and probability computation rules to Expression (5), the likelihood data $y_i$ is defined by the following Expression (6). In the present specification, likelihood data numerically represented by a logarithm of posterior probability of likelihood in a case where different symbols are transmitted, will be referred to as standard scale (theoretical scale) or standard unit likelihood data.

$$y_i = \ln\left(\frac{\sum_{s_X : b_i = 0} P(r_X | s_X)}{\sum_{s_X : b_i = 1} P(r_X | s_X)}\right) \tag{6}$$

The likelihood data $y_i$, on the AWGN communication channel is expressed as in the following Expression (7) by applying Expression (4) to Expression (6).

$$y_i = \ln\left(\frac{\sum_{s_X : b_i = 0} \exp\left(-\frac{1}{2\sigma^2}\left(r_X - \sqrt{E_s}\, s_X\right)^2\right)}{\sum_{s_X : b_i = 1} \exp\left(-\frac{1}{2\sigma^2}\left(r_X - \sqrt{E_s}\, s_X\right)^2\right)}\right) \tag{7}$$

Applying to the Expression (7) an approximation where only the dominant term yielding a maximum value for the sum is kept, approximates the likelihood data $y_i$ as in the following Expression (8), $$y_i = \max_{s_X : b_i = 0}\left\{-\frac{1}{2\sigma^2}\left(r_X - \sqrt{E_s}\, s_X\right)^2\right\} - \max_{s_X : b_i = 1}\left\{-\frac{1}{2\sigma^2}\left(r_X - \sqrt{E_s}\, s_X\right)^2\right\} \tag{8}$$

$$= -\frac{E_s}{N_0}\left\{\min_{s_I : b_i = 0}(r'_X - s_X)^2 - \min_{s_I : b_i = 1}(r'_X - s_X)^2\right\}$$

where $r'_x$ is defined by the following Expression (9).

$$r'_x = r_x / \sqrt{E_s} \tag{9}$$

The decoding unit 33 performs error-correction decoding processing using the soft decision data generated at the demodulation demapping unit 32, and estimates information bits transmitted from the transmitting device 2. For example, in a case where the encoding unit 21 has encoded an information bit series using turbo code such as described above, the decoding unit 33 may perform repetitive decoding processing where element decoding processing is repetitively performed. The decoding unit 33 may include a turbo decoder which executes this sort of processing.

A turbo decoder includes two constituent decoders corresponding to the two constituent encoders of the turbo encoder, and in order to realize consistency in order of the bit series, an interleaver and deinterleaver. A maximum a posteriori probability (MAP) algorithm, for example, is used for the constituent decoding processing by the constituent decoder. It is noted, however, that implementing a MAP algorithm to the constituent decoder without changing the format of the algorithm will result in increased design costs of the hardware for the constituent decoder. Accordingly, an algorithm modified to a format suitable for implementation is used. The turbo decoder executes decoding processing in increments of code blocks in the same way as the turbo encoder described above.

Now, modulation formats such as QPSK, 16QAM, and 64QAM, and code rates are dynamically changed in LTE, in accordance with the communication quality on the communication channel between the eNodeB and the UE. This technology is called adaptive modulation and coding (AMC).

Examples of transmission systems relating to the transmission antenna of the transmitting device 2 and the reception antenna of the receiving device 3 include single input single output (SISO), single input multi output (SIMO), and multi input multi output (MIMO). SISO is a transmission format configured by one transmission antenna and one reception antenna. SIMO is a transmission format configured by one transmission antenna and multiple reception antennas. MIMO is a transmission format configured by multiple transmission antennas and multiple reception antennas.

SIMO exhibits the diversity effect, by reception data including the same information being added to each other. SIMO yields likelihood data with improved signal to noise ratio (SNR) as compared to SISO, In MIMO, mutually different information data is each transmitted from multiple transmission antennas, the transmitted mutually different information data is multiplexed on a multipath communication channel, and the multiplexed information data is received by each of the multiple reception antennas. Likelihood data corresponding to each bit of the signal symbols transmitted from each transmission antenna can each be received in MIMO, by the multiple reception data series received by the multiple reception antennas being demodulated at the same time.

For example, MIMO with a maximum number of four transmission antennas and four reception antennas is standardized in LTE, and rank adaptation may be applied, in which the number of transmission streams is controlled in accordance with the communication quality on the communication channel 4 between the transmitting device 2 and the receiving device 3.

In the wireless communication system 1 described above, likelihood data $y_i$ obtained applying Expression (6), such as likelihood data $y_i$ on an AWGN communication channel represented in Expression (7) or Expression (8), is likelihood data which has been strictly defined numerically, and is standard scale likelihood data. However, the likelihood data input to the decoding unit 33 after processing at the demodulation demapping unit 32 is implementation scale likelihood data $y_{ai}$ which is different from the standard scale. This is due to the reception processing quantization processing, and so forth, at the reception processing unit 31. If we give a scale value (a scale ratio) $s_c$ to the ratio between the standard scale and implementation scale, the implementation scale likelihood data $y_{ai}$ is obtained by the following Expression (10).

$$y_{ai} = s_c y_i \tag{10}$$

In a case where the decoding unit 33 may generate suitable decoded bits with low code error rate by performing decoding processing of input likelihood data by standard scale, the code error rate of decoded bits will be higher if the likelihood data input to the decoding unit 33 is implementation scale likelihood data $y_{ai}$. Accordingly, a scale value $s_c$ is preferably identified to convert the scale (units) from the implementation scale to the standard scale, in order to obtain suitable decoded bits from the implementation scale likelihood data $y_{ai}$.

For example, in a case where the modulation format used at the transmitting device 2 and receiving device 3 is QPSK, a technique to identify a scale value $s_c$ by the calculation described below.

Assuming a code bit series $x_i$ and SNR $S_n$, the likelihood data $y_i$ is represented by the following Expression (11).

$$y_i = S_n x_i + n_i = S_n r_i \tag{11}$$

Now, $x_i$, $r_i$, and $S_n$, are each defined as in Expressions (12) through (14).

$$x_i = \pm 1 \tag{12}$$

$$r_i = x_i + n_i \tag{13}$$

$$S_n = SNR = E_s/N_0 \tag{14}$$

On the other hand, the implementation scale likelihood data $y_{ai}$ is defined as in the following Expression (15).

$$y_{ai} = A r_i \tag{15}$$

Substituting Expression (11) and Expression (15) into Expression (10) defines the scale value $s_c$ from the following Expression (16).

$$s_c = A/S_n \tag{16}$$

Now, the signal amplitude A and SNR in Expression (16) are obtained by the following calculation method.

First, the average of absolute values of the implementation scale likelihood data $y_{ai}$ and the mean square of the implementation scale likelihood data $y_{ai}$ may be calculated from the following Expressions (17) and (18), respectively.

$$\langle |y_{ai}| \rangle = \frac{1}{N} \sum_{i=0}^{N-1} |y_{ai}| \tag{17}$$

$$\langle y_{ai}^2 \rangle = \frac{1}{N} \sum_{i=0}^{N-1} y_{ai}^2 \tag{18}$$

The average of absolute values of the implementation scale likelihood data $y_{ai}$ and the mean square of the implementation scale likelihood data $y_{ai}$ have a relation with variance $\sigma^2$ of the noise signal $n_i$ and reception amplitude a, as indicated in the following Expressions (19) and (20).

$$\langle |y_{ai}| \rangle = a \times mag(\sigma) \tag{19}$$

$$\langle y_{ai}^2 \rangle = a^2(1+\sigma^2) \tag{20}$$

Now, $mag(\sigma)$ which is the amplitude of the standard variation $\sigma$ of the noise $n_i$ is expressed as a complex function of the variance $\sigma^2$ of the noise signal $n_i$, so the decoder has a table indicating the relation between $\sigma^2$ and $mag(\sigma)$.

Based on the relation illustrated in Expressions (19) and (20), the signal amplitude A and SNR are obtained from the following Expressions (21) and (22).

$$A = \frac{C \times (2^q - 1)}{mag(\sigma)} \tag{21}$$

$$SNR = 2a^2/\sigma^2 \tag{22}$$

Here, C represents a fixed coefficient obtained beforehand by simulation, and q represents quantization bits.

The scale value $s_c$ is obtained by substituting Expressions (21) and (22) into Expressions (16).

See S. S. Pietrobon, "Implementation and performance of a turbo/MAP decoder", http://www.itr.unisa.edu.au/~steven/turbo/turboMAP.ps.gz, Aug. 29, 2012 confirmed by the inventor.

SUMMARY

According to an aspect of the invention, a receiving device includes a reception circuit configured to receive radio signals transmitted from another device and to derive reception symbols from the radio signals, a demodulation circuit configured to generate first likelihood data of the reception symbols based on a transmission format of the reception symbols, the transmission format being selected from transmission formats and including a modulation scheme applied to the reception symbols, the modulation scheme being one of amplitude modulation schemes, a processor configured to estimate a scale ratio of an implementation scale to a theoretical scale, the implementation scale being a scale of the first likelihood data, the theoretical scale being a scale of second likelihood data of the reception symbols, the second likelihood data being defined by a theory and not depending on an implementation of the receiving device, and to generate the second likelihood data based on the first likelihood data and the scale ratio, and a decoding circuit configured to decode the second likelihood data based on the transmission format.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an exemplary list of parameters for turbo code executed by the encoding unit;

FIG. 5 is an exemplary diagram of an average-of-absolute-values table;

DESCRIPTION OF EMBODIMENTS

However, the calculation method described above by way of Expressions (11) through (22) is not readily applicable in a case where the modulation format is multilevel modulation such as 16QAM. The reason thereof may be described as follows.

In a case where the modulation format is QPSK, Expression (7) may be approximated as in the following Expression (23).

$$y_i = -\frac{1}{2\sigma^2}(r_X - \sqrt{E_s}\,s_X)^2 - \frac{1}{2\sigma^2}(r_X + \sqrt{E_s}\,s_X)^2 \quad (23)$$
$$= \frac{4\sqrt{E_s}\,s_X}{2\sigma^2}r_X$$
$$= c\frac{E_s}{N_0}r''_X$$

Note however, that $r''_X$ in Expression (23) is as in the following Expression (24) where c=2.

$$r''_X = \frac{2}{\sqrt{2E_s}}r_X = x_i + n_{aX} \quad (24)$$
$$x_i = \pm 1$$

It is understandable from Expression (23) that the likelihood data $y_i$ may be expressed in a format proportionate to reception data $r_i$ with the SNR as a proportionality coefficient, if the modulation format is QPSK. Thus, the reception amplitude a and variance $\sigma^2$ may be represented by the average of absolute values of likelihood data $y_i$ and mean square of likelihood data $y_i$, as in Expressions (19) and (20).

However, in a case where the modulation format is multilevel modulation, approximation of Expression (7) as with Expression (23) is not an option, so the relation between likelihood data $y_i$, transmission signal $x_i$, and SNR, is expressed by a complex function including a logarithmic function LOG and exponential function exp. This makes it difficult to obtain the reception amplitude a and variance $\sigma^2$ by the average of absolute values of likelihood data $y_i$ and mean square of likelihood data $y_i$, as in Expressions (19) and (20).

It has been found desirable to realize decoding processing in which decoded bits are generated from implementation scale likelihood data with low code error rate, in accordance with difference in transmission formats such as transmission system, modulation format, code rate, and so forth.

Embodiments will be described with reference to the drawings.

First Embodiment

Figure 1:
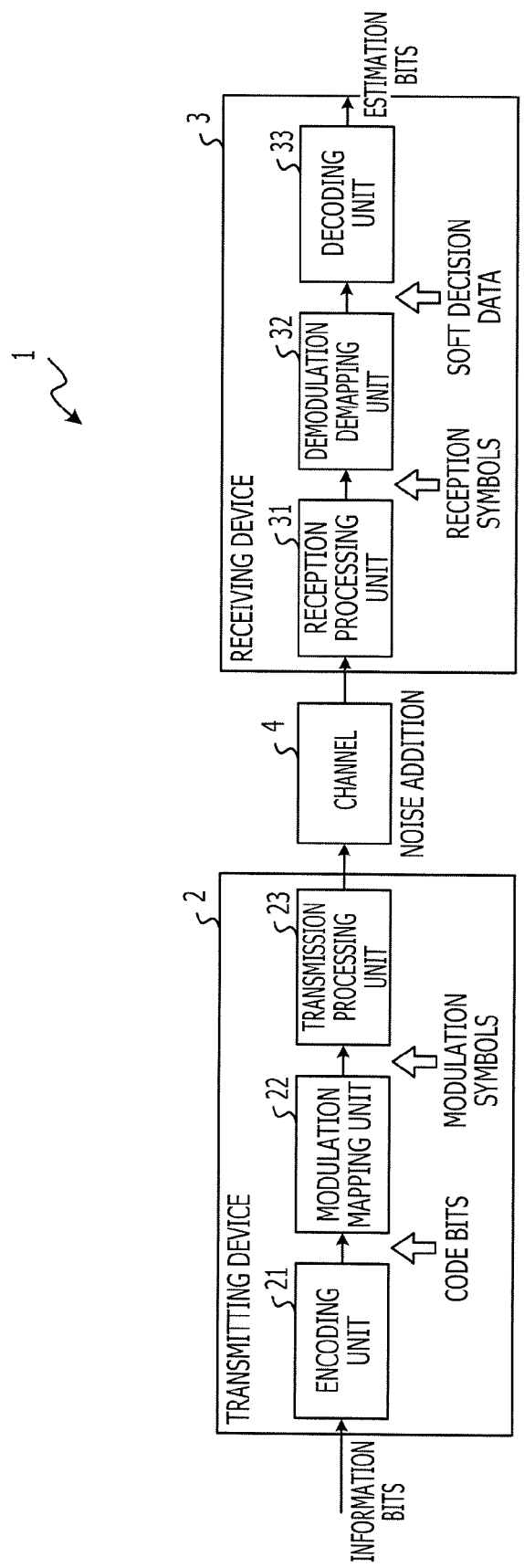
FIG. 1 is an exemplary diagram of a wireless communication system.
Figure 2:
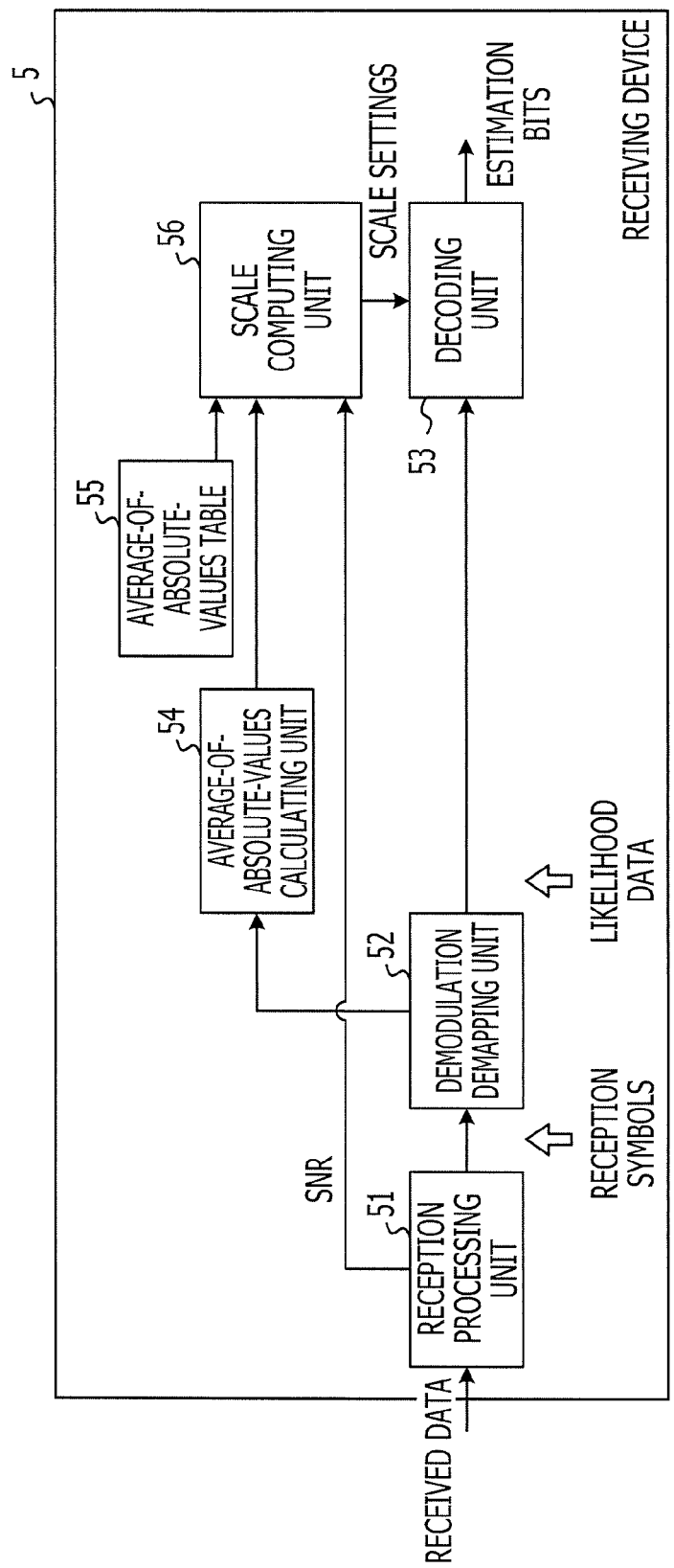
FIG. 2 is a schematic functional configuration diagram of a receiving device according to a first embodiment.

FIG. 2 is a schematic functional configuration diagram of a receiving device according to a first embodiment. A receiving device 5 according to the first embodiment as illustrated in FIG. 2 may be included in the wireless communication system 1 instead of the receiving device 3, so as to receive data signals transmitted from the transmitting device 2 which is a device at the other end, and demodulate and decode the received data signals.

Figure 3:
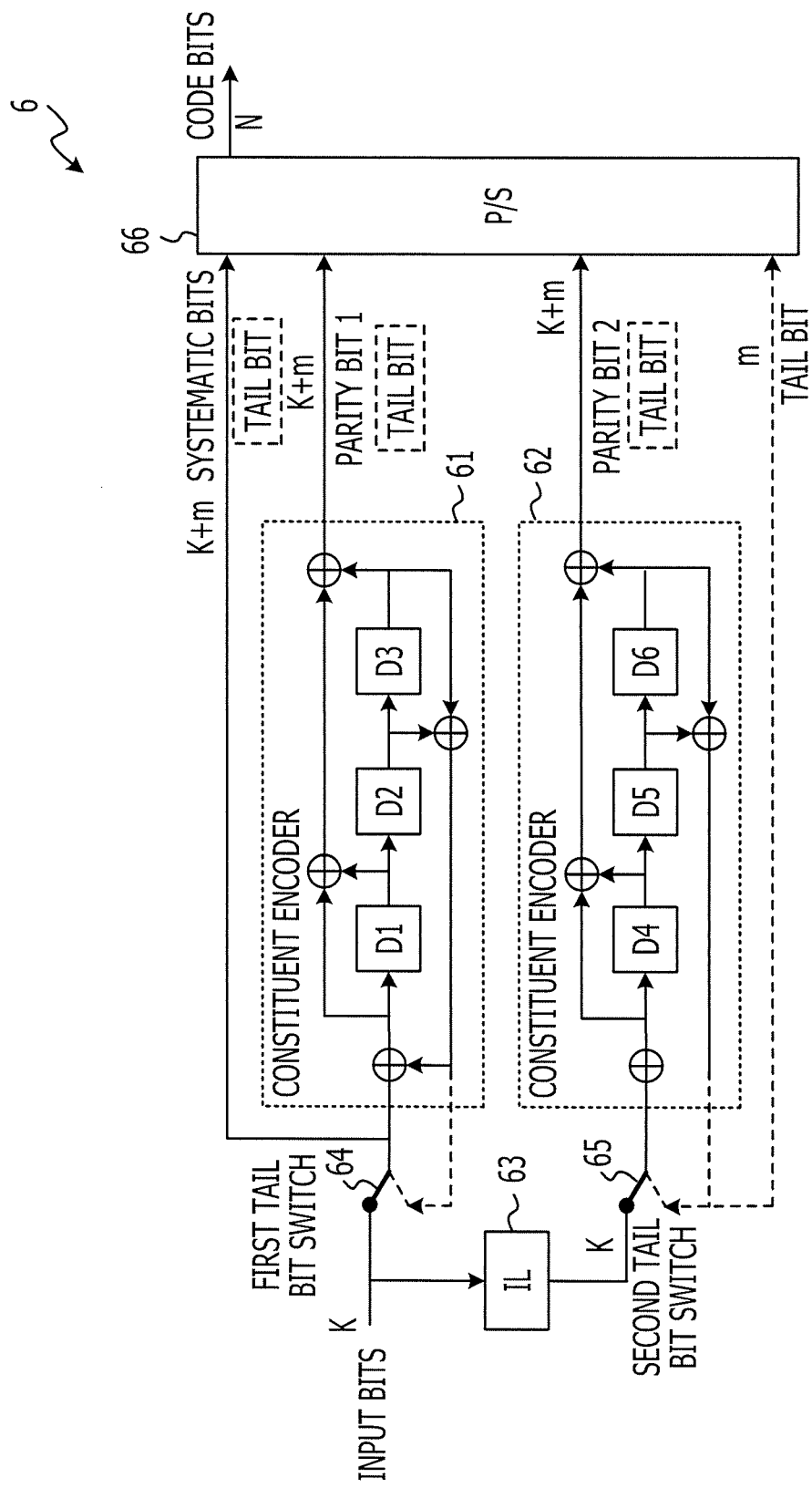
FIG. 3 is an exemplary configuration diagram of a turbo encoder included in an encoding unit.

The encoding unit 21 of the transmitting device 2 encodes information bits to be transmitted at a predetermined code rate determined in accordance with the wireless communication quality on the communication channel 4 between the transmitting device 2 and receiving device 5, and thereby generates code bits. FIG. 3 is an exemplary configuration diagram of a turbo encoder included in an encoding unit, and FIG. 4 is an exemplary list of parameters for turbo code executed by the encoding unit. The turbo encoder 6 illustrated in FIG. 3 and the parameters for turbo code illustrated in FIG. 4 may conform to 3GPP specifications (for example TS.212 v8.9.0, v10.6.0).

As illustrated in FIG. 3, the turbo encoder 6 includes a first elementary encoder 61, a second elementary encoder 62, an interleaver 63, a first tail bit switch 64, a second tail bit switch 65, and a parallel/serial converter 66. The first elementary encoder 61 includes three delay memory devices D1 through D3, and the second elementary encoder 62 includes three delay memory devices D4 through D6.

Information bits to be transmitted are input in their original order into the first elementary encoder 61, and information bits interleaved by the interleaver 63 are input to the second elementary encoder 62. The first and second elementary encoders 61 and 62 perform bit shifting of the input information bits using the delay memory devices D1 through D6. The first and second elementary encoders 61 and 62 then feedback the bit-shifted output bits to input bits, and also output as parity bit series $x_{p1}$ and parity bit series $x_{p2}$. Trellis termination is applied for termination of the encoding. That is to say, after the last information bit has been input to the first and second elementary encoders 61 and 62, the first and second tail bit switches 64 and 65 are switched from the input bit side to the output bit side fed back. Tail bits of a number equivalent to the number of the delay memory devices D1 through D3 and D4 through D6 of the first and second elementary encoders 61 and 62 are each input to the first and second elementary encoders 61 and 62. The parallel/serial converter 66 performs rate matching processing of the parity bit series $x_{p1}$ and parity bit series $x_{p2}$, serially splices the rate-matched parity bit series $x_{p1}$ and parity bit series $x_{p2}$ and an systematic bit series $x_s$ which is an information bit series, and outputs code bits.

The modulation mapping unit 22 modulates the code bits according to a predetermined modulation format selected from modulation formats such as QPSK, 16QAM, and 64QAM, in accordance with the wireless communication quality of the communication channel 4 between the transmitting device 2 and receiving device 5, and maps to signal symbols.

The transmission format including the above-described code rate and modulation formats, and transmission systems such as SISO, SIMO, and MIMO, may be adaptively changed in accordance with the wireless communication quality of the communication channel 4 between the transmitting device 2 and receiving device 5. For example, the receiving device 5 measures the wireless communication quality of control signals transmitted from the transmitting device 2. An example of a control signal transmitted from the transmitting device 2 is a demodulation reference signal (DMRS). An example of the wireless communication quality is the SNR value of the control signal. The receiving device 5 transmits the measured wireless communication quality data to the transmitting device 2. The wireless communication quality data is transmitted via a physical uplink control channel (PUCCH) as a channel quality indicator (CQI). The transmitting device 2 receives the wireless communication quality data transmitted from the receiving device 5, decides the transmission format of the wireless data signals from the transmitting device 2 to the receiving device 5 in accordance with the received wireless communication quality data, and notifies the receiving device 5 of the transmission format which has been decided upon. The transmission format is notified from the transmitting device 2 to the receiving device 5 over the PDCCH, for example. The receiving device 5 receives the transmission format transmitted from the transmitting device 2, and performs decoding processing of the wireless data signals transmitted from the transmitting device 2 in accordance with the received transmission format.

As illustrated in FIG. 2, the receiving device 5 according to the first embodiment includes a reception processing unit 51, a demodulation demapping unit 52, a decoding unit 53, an average-of-absolute-values calculating unit 54, an average-of-absolute-values table 55, and a scale computing unit 56.

The reception processing unit 51 processes the reception data signals received from the transmitting device 2 over the communication channel 4 in the same way as with the reception processing unit 31 described above, and generates a reception symbol $r_i$. The reception processing unit 51 then transmits the generated reception symbol $r_i$ to the demodulation demapping unit 52. The reception processing unit 51 also measures the SNR of the reception data symbol $r_i$, and transmits the measured SNR value to the scale computing unit 56.

The demodulation demapping unit 52 receives the reception symbol $r_i$ transmitted from the reception processing unit 51. The demodulation demapping unit 52 then performs processing the same as that of the demodulation demapping unit 32 described earlier on the reception symbol $r_i$ that has been received, in accordance with the transmission format notified from the transmitting device 2, and generates likelihood data (soft decision data) $y_{ai}$. The demodulation demapping unit 52 further transmits the generated likelihood data $y_{ai}$ to the decoding unit 53 and average-of-absolute-values calculating unit 54.

The average-of-absolute-values calculating unit 54 receives the likelihood data $y_{ai}$ transmitted from the demodulation demapping unit 52. The average-of-absolute-values calculating unit 54 then calculates the average of absolute values of the received likelihood data $y_{ai}$ using Expression (17). The average-of-absolute-values calculating unit 54 transmits the calculated average of absolute values of the likelihood data $y_{ai}$, which is $\langle |y_{ai}| \rangle$, to the scale computing unit 56.

The average-of-absolute-values table 55 stores, as table values, values obtained by dividing the average of absolute values of standard scale likelihood data $y_i$ by the SNR, in accordance with combinations of transmission formats such as transmission system, modulation format, and code rate. The average of absolute values of standard scale likelihood data $y_i$ is expressed in the following Expression (25).

$$\langle |y_i| \rangle = \frac{1}{N} \sum_{i=0}^{N-1} |y_i| \tag{25}$$

Accordingly, a value obtained by dividing the average of absolute values of standard scale likelihood data $y_i$ by the SNR, which is a table value T(I), is expressed in the following Expression (26).

$$T(I) = \frac{\langle |y_i| \rangle}{SNR} \tag{26}$$

Now, I is an argument serving as a parameter to differentiate between combinations of transmission formats such as transmission system, modulation format, and code rate. Thus, the average-of-absolute-values table 55 is a table where combinations of transmission formats such as transmission system, modulation format, and code rate are represented by the parameter I, and values obtained by dividing the average of absolute values of standard scale likelihood data $y_i$ by the SNR, are table values T(I).

The table values T(I) stored in the average-of-absolute-values table 55 are obtained by, for example, performing simulation using a candidate T(I) value for the combinations of transmission formats differentiated by the parameter I, and identifying table values T(I) of which property deterioration of block error rate (BLER) falls within a stipulated range.

FIG. 5 is an exemplary diagram of an average-of-absolute-values table. As illustrated in FIG. 5, the average-of-absolute-values table 55 stores table values in accordance with combinations of modulation formats and code rates. The combinations of modulation formats and code rates are combinations for adaptive modulation and coding in accordance with the wireless communication quality of the communication channel 4 between the transmitting device 2 and receiving device 5. This is called "Modulation and Coding Scheme (MCS)". The average-of-absolute-values table 55 such as illustrated in FIG. 5 is prepared beforehand for each transmission system which the wireless communication system 1 may assume.

Note that FIG. 5 is only an example of an average-of-absolute-values table 55. For example, instead of the configuration where the table values T(I) corresponding to the combinations of modulation formats and code rates, an arrangement may be made where linear functions of table values T(I) of which the code rate is a variable, are stored in the average-of-absolute-values table 55 for each modulation format.

A table value T(I) matching the transmission format notified from the transmitting device 2 is transmitted from the average-of-absolute-values table 55 to the scale computing unit 56.

The scale computing unit 56 receives the SNR value measured by the reception processing unit 51, the average of absolute values of the likelihood data $\langle|y_{ai}|\rangle$ calculated by the average-of-absolute-values calculating unit 54, and the table value T(I) extracted form the average-of-absolute-values table 55. The scale computing unit 56 obtains the scale value $s_c$ by computing the ratio between a value obtained by dividing the received average of absolute values of the likelihood data $\langle|y_{ai}|\rangle$ by the received SNR, and the received table value T(I). That is to say, the scale computing unit 56 computes the scale value $s_c$ by substituting these received values into the following Expression (27).

$$s_c = \frac{\langle|y_{ai}|\rangle}{SNR \times T(I)} \qquad (27)$$

The scale computing unit 56 then transmits the computed scale value $s_c$ to the decoding unit 53.

Thus, the average-of-absolute-values calculating unit 54, average-of-absolute-values table 55, scale computing unit 56, and so forth, execute scale value obtaining processing according to the first embodiment. Note that an arrangement may be made in a case where the transmission format notified from the transmitting device 2 is multilevel modulation, where scale value obtaining processing according to the first embodiment is performed as to likelihood data $y_{ai}$ of the head bit of each received symbol mapped to the complex plane (signal space). Alternatively, an arrangement may be made where the scale value obtaining processing is performed on packet data blocks (transport blocks) received each reception sub frame (for example, encoding processing unit 0.1 ms). That is to say, an arrangement may be made where the same scale value $s_c$ is applied to each transport block.

The decoding unit 53 receives the likelihood data $y_{ai}$ transmitted from the demodulation demapping unit 52 and the scale value s, transmitted from the scale computing unit 56. The decoding unit 53 performs error-correction decoding processing on the received likelihood data $y_{ai}$ using the received scale value $s_c$, according to the transmission format notified from the transmitting device 2, thereby generating decoded bits estimating the transmission bits transmitted from the transmitting device 2.

For example, the decoding unit 53 may obtain the standard scale likelihood data $y_i$ by dividing the implementation scale likelihood data $y_{ai}$ by the scale value $s_c$, as in the following Expression (28). The decoding unit 53 then may generate decoded bits with low code error rate by decoding processing of the calculated likelihood data $y_i$.

$$y_i = y_{ai}/s_c \qquad (28)$$

Also, instead of scale conversion (unit conversion) such as in Expression (28), the decoding unit 53 may adjust the implementation scale likelihood data $y_{ai}$ into standard scale using the scale value $s_c$, such as described later. The decoding unit 53 then may generate decoded bits with low code error rate by decoding processing using the likelihood data $y_{ai}$ adjusted to standard scale.

Figure 6:
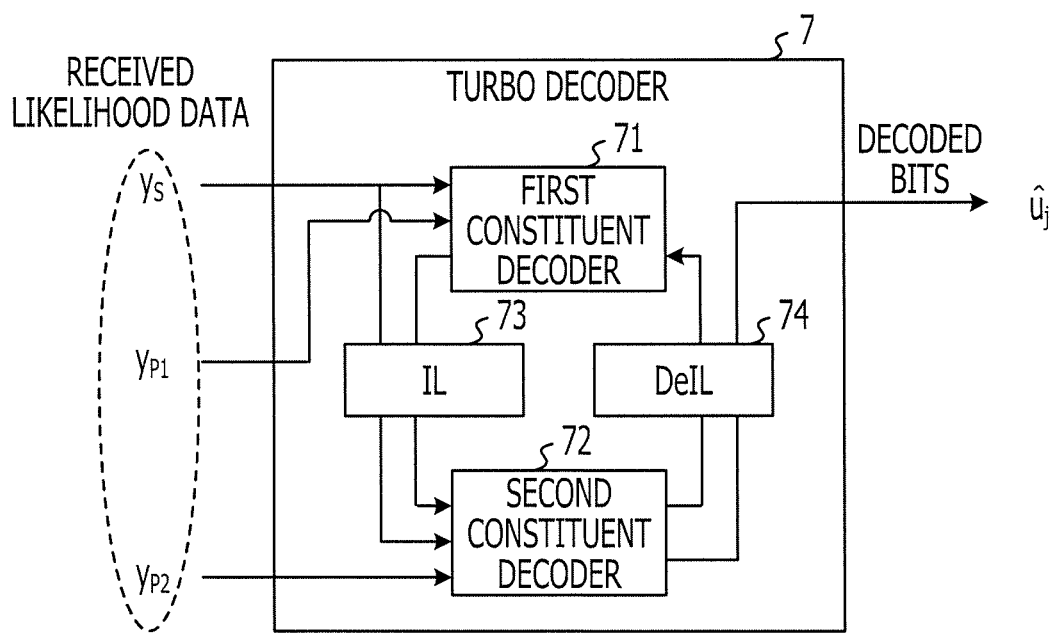
FIG. 6 is an exemplary configuration diagram of a turbo decoder included in a decoding unit.

The decoding unit 53 may execute the turbo decoding described above as error-correction decoding processing. FIG. 6 is an exemplary configuration diagram of a turbo decoder included in a decoding unit. As illustrated in FIG. 6, the turbo decoder 7 includes a first constituent decoder 71, a second constituent decoder 72, an interleaver 73, and a deinterleaver 74.

Likelihood data $y_s$ corresponding to an systematic bit series $x_s$ and likelihood data $y_{p1}$ corresponding to parity bit series $x_{p1}$ are input to first constituent decoder 71. Likelihood data $y_{p1}$ interleaved by the interleaver 73 and likelihood data $y_{p2}$ corresponding to parity bit series $x_{p2}$ are input to the second constituent decoder 72. The likelihood data $y_{p1}$ and likelihood data $y_{p2}$ may be said to be information of probability to estimate the transmission bit series which the transmitting device 2 has transmitted to the receiving device 5. The constituent decoders 71 and 72 obtain a priori probability based on the received likelihood data $y_{p1}$ and likelihood data $y_{p2}$, and obtain a posteriori probability by performing conditional probability computation based on the obtained a priori probability.

Specifically, the first constituent decoder 71 obtains a posteriori probability using the likelihood data $y_s$ and likelihood data $y_{p1}$. The a posteriori probability obtained by the first constituent decoder 71 is interleaved by the interleaver 73, and the interleaved a posteriori probability is input to the second constituent decoder 72. The a posteriori probability input to the constituent decoder 72 is used as external information to obtain a priori probability in the second constituent decoder 72. The a posteriori probability obtained by the second constituent decoder 72 is deinterleaved by the deinterleaver 74, and used as external information of the first constituent decoder 71. Thus, the a posteriori probability obtained at each of the first constituent decoder 71 and second constituent decoder 72 is fed back to the other, so that computation processing is successively performed at the first constituent decoder 71 and second constituent decoder 72, thereby improving estimation precision of a posteriori likelihood.

A Log-MAP algorithm is used for constituent decoding processing by the constituent decoders 71 and 72. Specifically, in forward computing, with two state candidates $s_1$ and $s_2$ at point-in-time i corresponding to the input order of an information bit series $x_i$ to the constituent decoder, and a state s at point-in-time i+1, the forward probability $\alpha_i(s)$ is obtained as in the following Expression (29), $$\alpha_i(s) = \max{}^* (\eta_{i-1}(s_1, s), \eta_{i-1}(s_2, s)) \qquad (29)$$
$$= \max(\eta_{i-1}(s_1, s), \eta_{i-1}(s_2, s)) +$$
$$\log(1 + e^{-|\eta_{i-1}(s_1,s)-\eta_{i-1}(s_2,s)|})$$

where $\gamma$ represents state transition probability, and $\gamma_{i-1}(s_1, s)$ represents state transition probability from $s_1$ to s at point-in-time i−1, and max* is a maximum value selection function of an element greater than 2, defined with regard to a given sequence $x_1, x_2, \ldots, x_n$ by the following Expression (30). $\eta_{i-1}(s_1, s)$ is as in the following Expression (31).

$$\max{}^*(x_1,x_2,\ldots,x_n)=\ln(e^{x_1}+e^{x_2}+\ldots+e^{x_n}) \qquad (30)$$

$$\eta_{i-1}(s_1,s)=\alpha_{i-1}(s_1)+\gamma_{i-1}(s_1,s) \qquad (31)$$

Also, in backward computing, assuming two state candidates at point-in-time i+1 which are $s_1$ and $s_2$, and the state at point-in-time i which is s, the backward probability $\beta(s)$ is obtained from the following Expression (32), $$\beta_i(s) = \max^*(\zeta_i(s, s_1), \zeta_i(s, s_2)) \quad (32)$$
$$= \max(\zeta_i(s, s_1), \zeta_i(s, s_2)) + \log(1 + e^{-|\zeta_i(s,s_1)-\zeta_i(s,s_2)|})$$

where $\zeta_i(s,s_1)$ in Expression (32) is as in the following Expression (33).

$$\zeta_i(s,s_1) = \beta_{i+1}(s_1) + \gamma_i(s,s_1) \quad (33)$$

Assuming a state candidate $s_1$ at point-in-time i, and a state candidate $s_2$ at point-in-time i+1, a posteriori likelihood L(i) is obtained from the following Expression (34) using the results of forward computation and backward computation.

$$L(i) = L_0(i) - L_1(i) \quad (34)$$

Further, assuming a set of branches $B_b$ of which the input bit value is b, $L_b(i)$ is as in Expression (35).

$$L_b(i) = \max_{(s_1,s_2) \in B_b}{}^* (\theta_i(s_1, s_2)) \quad (35)$$

Assuming information bits $u(s_1, s_2)$, $\theta_i(s_1, s_2)$ in Expression (35) may be expressed as in Expression (36).

$$\theta_i(s_1,s_2) = \alpha_i(s_1) + \gamma_i(s_i, u(s_1,s_2)) + \beta_{i+1}(s_2) \quad (36)$$

Now, likelihood data $y_i$, forward probability $\alpha_i$, backward probability $\beta_i$, and state transition probability $\gamma_i$ have the relationships in the following Expressions (37) through (39), and are all values on the same scale.

$$\gamma_i = \pm y_{s,i} \pm y_{p,i} \quad (37)$$

$$\alpha_i = \sum_k \gamma_k \quad (38)$$

$$\beta_i = \sum_k \gamma_k \quad (39)$$

Note that the likelihood data $y_{s,i}$ in Expression 37) represents an systematic bit sequence, and likelihood data $y_{p,i}$ represents a parity bit series input to the first constituent decoder 71 or second constituent decoder 72.

The decoding unit 53 corrects the correction term in the LOG-MAP algorithm according to the scale value $s_c$, thereby generating decoded bits from the implementation scale likelihood data $y_{ai}$ using Expressions (29) through (36). The correction term in the LOG-MAP algorithm is the logarithmic function indicated by the MAX* operation in Expressions (29) and (32). The logarithmic function f(x) in Expressions (29) and (32) is as expressed in the following Expression (40).

$$f(x) = \log(1 + e^{-x}) \quad (40)$$

Let as assume a logarithmic function $f_a(x_a)$ to generate decoded bits from the implementation scale likelihood data $y_{ai}$. For example, the implementation scale forward probability $\alpha_{ai}$ is expressed as in the following Expression (41) using the correction function $f_a(x_a)$.

$$\alpha_{ai}(s) = \max(\eta_{a,i-1}(s_1, s), \eta_{a,i-1}(s_2, s)) + f_a(x_a) \quad (41)$$
$$= \alpha_{ai}^{(0)}(s) + f_a(x_a)$$

In a case of the decoding unit 53 dividing the implementation scale forward probability $\alpha_{ai}$ by the scale value $s_c$ to adjust the forward probability $\alpha_{ai}$ received from the demodulation demapping unit 52, the scale-adjusted standard scale forward probability $\alpha_i$ is as expressed in the following Expression (42).

$$\alpha_i(s) = \alpha_i^{(0)}(s) + f(x_a/s_c) \quad (42)$$

Alternatively, a different method to adjust the implementation scale likelihood data $\alpha_{ai}$ to the standard scale may be employed, in which the implementation scale forward probability $\alpha_{ai}$ is scale-adjusted to scale-value $s_c$-times the standard scale forward probability $\alpha_i$. In this case, in order to adjust the implementation scale forward probability $\alpha_{ai}$ to scale-value $s_c$-times the standard scale forward probability $\alpha_i$, the decoding unit 53 corrects the implementation scale logarithmic function $f_a(x_a)$ by the scale value $s_c$ as in the following Expression (43).

$$f_a(x_a) = s_c f(x_a/s_c) = s_c \log\left(1 + e^{-\frac{x_a}{s_c}}\right) \quad (43)$$

Thus, the decoding unit 53 may perform scale adjustment according to a method such as in Expressions (41) and (43), instead of correcting the entire likelihood data $y_{ai}$ by the scale value $s_c$ as in Expressions (28) and (42). That is to say, the decoding unit 53 may generate decoded bits with low code error rate, by performing decoding processing using likelihood data $y_{ai}$ with the correction term in the LOG-MAP algorithm corrected by the scale value $s_c$. This method enables easy hardware implementation of the decoding unit 53, since decoding processing may be performed using the likelihood data $y_{ai}$ received from the demodulation demapping unit 52.

Figure 7:
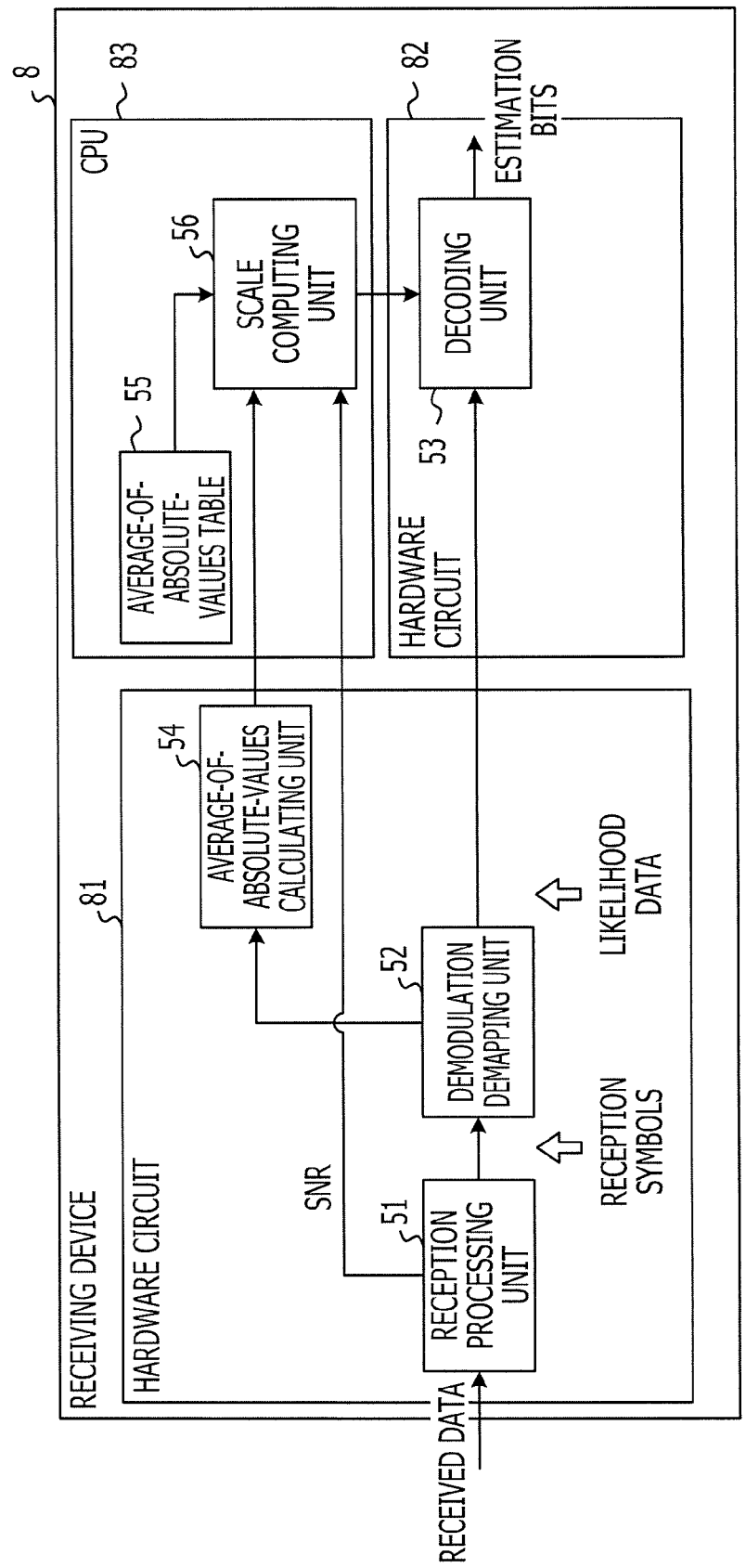
FIG. 7 is an exemplary hardware configuration diagram of a receiving device according to the first embodiment.

FIG. 7 is an exemplary hardware configuration diagram of a receiving device according to the first embodiment. The example illustrated in FIG. 7 is a configuration where the reception processing unit 51, demodulation demapping unit 52, and average-of-absolute-values calculating unit 54 are implemented by a hardware circuit 81 of a receiving device 8, while the decoding unit 53 is implemented by a separate hardware circuit 82. The average-of-absolute-values table 55 and scale computing unit 56 are implemented by a central processing unit (CPU) 83.

Note that the hardware configuration illustrated in FIG. 7 is but an example, and that the receiving device 5 may be implemented by any device and any hardware circuit which may carry out the reception method according to the first embodiment. An example of "any device" besides a CPU is a digital signal processor (DSP). Examples of "any hardware circuit" include an application specific integrated circuit (ASIC), a field programmable gate array (FPGA), and a very large scale integration (VLSI).

Figure 8:
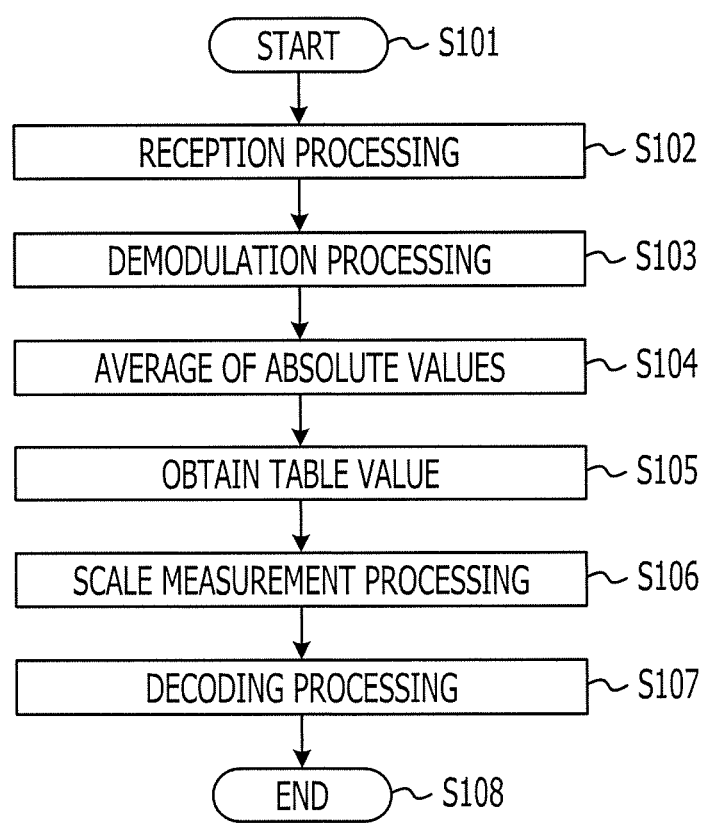
FIG. 8 is an exemplary flowchart of decoding processing by the receiving device according to the first embodiment.

An example of the reception data decoding method by the receiving device 5 according to the first embodiment will be described with reference to FIG. 8. FIG. 8 is an exemplary flowchart of decoding processing by the receiving device according to the first embodiment.

Upon having received data signals transmitted from the transmitting device 2 by the reception processing unit 51, a series of decoding processing by the receiving device 5 is started (step S101). The reception processing unit 51 performs reception processing such as synchronous detection on the reception data, and generates reception symbols $r_i$ represented in the format of points in signal space (step S102). The reception processing unit 51 transmits the generated reception symbols $r_i$ to the demodulation demapping unit 52. The reception processing unit 51 also measures the SNR as to the reception data, and transmits the measured SNR value to the scale computing unit 56.

The demodulation demapping unit 52 receives the reception symbols $r_i$ transmitted from the reception processing unit 51. The demodulation demapping unit 52 then subjects the received reception symbols $r_i$ to demodulating processing in accordance with the transmission format notified from the transmitting device 2, and generates likelihood data $y_{ai}$ (step S103). The demodulation demapping unit 52 transmits the generated likelihood data $y_{ai}$ to the decoding unit 53 and the average-of-absolute-values calculating unit 54.

The average-of-absolute-values calculating unit 54 receives the likelihood data $y_{ai}$ transmitted from the demodulation demapping unit 52. The average-of-absolute-values calculating unit 54 then calculates the average of absolute values of the received likelihood data $y_{ai}$ (step S104). The average-of-absolute-values calculating unit 54 transmits the average of absolute values of the calculated likelihood data $y_{ai}$, which is $<|y_{ai}|>$, to the scale computing unit 56.

The average-of-absolute-values table 55 transmits a table value which matches the transmission format notified form the transmitting device 2, to the scale computing unit 56 (step S105).

The scale computing unit 56 receives the SNR value measured by the reception processing unit 51, the average of absolute values of the likelihood data $<|y_{ai}|>$ calculated by the average-of-absolute-values calculating unit 54, and the table value T(I) extracted form the average-of-absolute-values table 55. The scale computing unit 56 obtains the scale value $s_c$ by computing the ratio between a value obtained by dividing the received average of absolute values of the likelihood data $<|y_{ai}|>$ by the received SNR value, and the received table value T(I) (step S106). The scale computing unit 56 then transmits the computed scale value $s_c$ to the decoding unit 53.

The decoding unit 53 receives the likelihood data $y_{ai}$ transmitted from the demodulation demapping unit 52 and the scale value $s_c$ transmitted from the scale computing unit 56. The decoding unit 53 performs error-correction decoding on the received likelihood data $y_{ai}$ using the received scale value $s_c$, according to the transmission format notified from the transmitting device 2, thereby generating decoded bits estimating the transmission bits transmitted from the transmitting device 2. More specifically, the decoding unit 53 corrects the correction term in the LOG-MAP algorithm according to the received scale value $s_c$, thereby performing turbo decoding processing of the received likelihood data $y_{ai}$ using the LOG-MAP algorithm (step S107).

Upon the decoded bits estimating the information bits transmitted from the transmitting device 2 being obtained by the decoding processing in step S107, the series of decoding processing on the reception data ends (step S108).

Thus, the receiving device 5 according to the first embodiment performs decoding processing by correcting the implementation scale likelihood data $y_{ai}$, following a predetermined transmission format by a scale value $s_c$ which is a ratio between the standard scale and implementation scale. Accordingly, decoded bits may be generated from implementation scale likelihood data with low code error rate, in accordance with difference in transmission formats such as transmission system, modulation format, code rate, and so forth.

Figure 9:
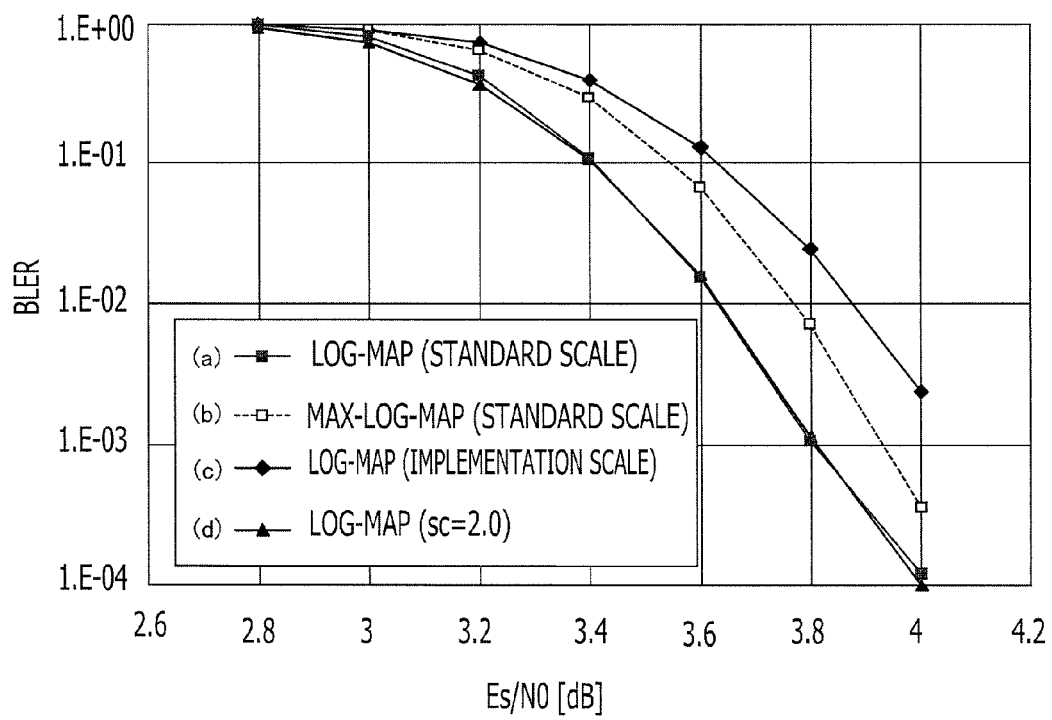
FIG. 9 is an exemplary properties diagram obtained by decoding processing according to the first embodiment.

FIG. 9 is an exemplary properties diagram obtained by decoding processing according to the first embodiment. FIG. 9 illustrates simulation results of cases where the information bit size K was set to 1536 bits, modulation format to 16QAM, code rate R to ⅓, and using an AWGN communication channel for the communication channel 4. The horizontal axis in FIG. 9 represents the SNR ($E_s$/N0), and the vertical axis represents the block error rate (BLER).

The curve (a) in FIG. 9 represents simulation results of having performed decoding processing on standard scale likelihood data using the LOG-MAP algorithm. The curve (b) in FIG. 9 represents simulation results of having performed decoding processing on standard scale likelihood data using the MAX-LOG-MAP algorithm. The LOG-MAP algorithm is an algorithm equivalent to an ideal maximum-likelihood decoding algorithm in turbo decoding, and the MAX-LOG-MAP algorithm is an approximation algorithm where the correction term is ignored. Accordingly, the simulation results of (b) exhibit poorer block error rate properties as compared to the simulation results of (a).

The curve (c) in FIG. 9 represents simulation results of having performed decoding processing on implementation scale likelihood data using the LOG-MAP algorithm. Comparing (a) and (c) reveals that performing decoding processing of implementation scale likelihood data without scale adjustment results in poorer block error rate properties.

The curve (d) in FIG. 9 represents simulation results of having performed decoding processing according to the first embodiment. The scale value $s_c$ is set to 2.0 in (d). Comparing (a), (c), and (d) reveals that adjusting implementation scale likelihood data by a scale value results in significant improvement in block error rate, yielding ideal properties. Assuming a target block error rate of 0.1 to 0.01, the simulation results of (d) in accordance with the decoding processing of the first embodiment exhibit improved properties by 0.15 dB over the simulation results of (b).

Thus, the decoding processing according to the first embodiment allows a highly-precise scale value to be obtained regardless of difference in transmission format, and code error rate of decoded bits to be reduced.

Second Embodiment

A receiving device according to a second embodiment corrects implementation scale likelihood data by a scale value corresponding to a predetermined transmission format and performs decoding processing, in a case where the implementation scale likelihood data has been quantized within an optional quantization range corresponding to the wireless communication quality of the communication channel.

Figure 10:
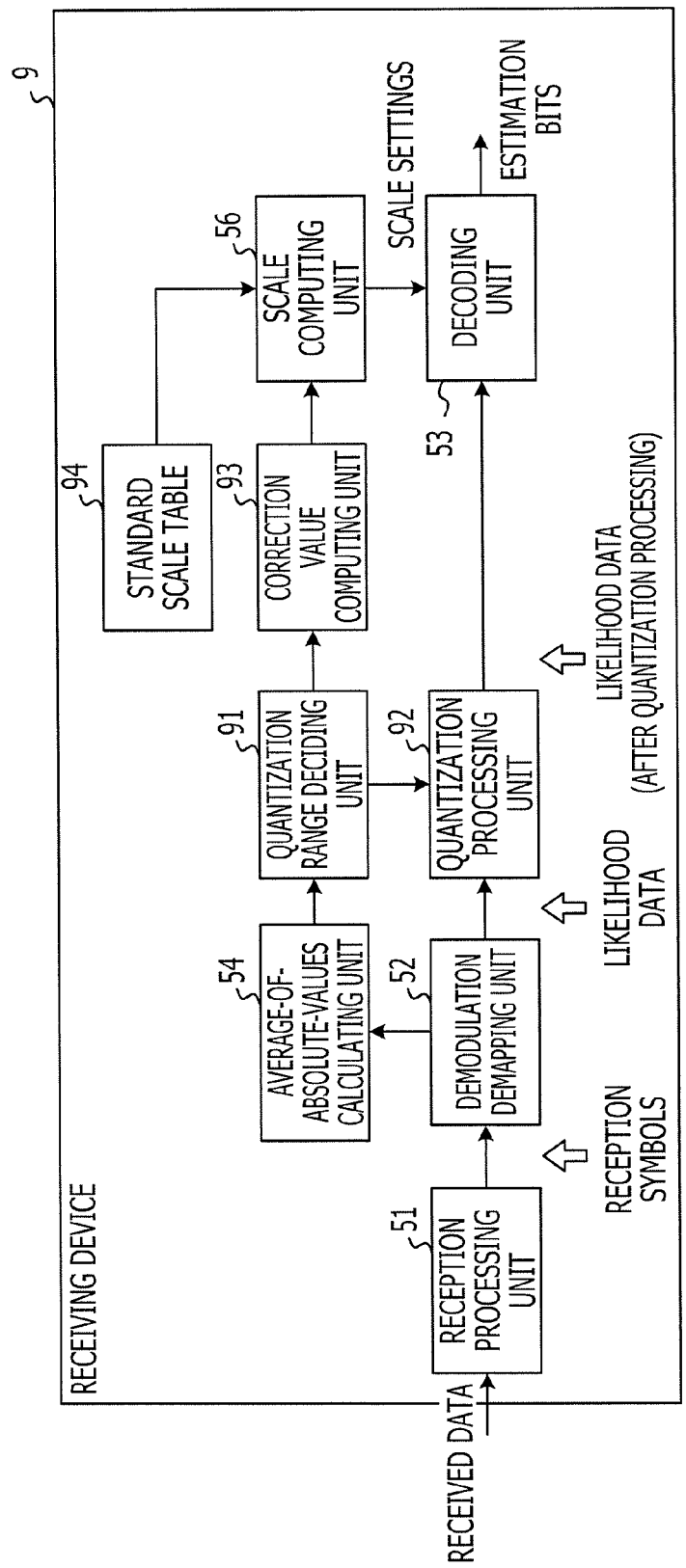
FIG. 10 is a schematic functional configuration diagram of a receiving device according to a second embodiment.

FIG. 10 is a schematic functional configuration diagram of a receiving device according to the second embodiment. A receiving device 9 according to the second embodiment illustrated in FIG. 10 may be included in the wireless communication system 1 instead of the receiving device 3, to receive data signals transmitted from the transmitting device 2 which is a device at the other end, and demodulate and decode the received data signals. Components of the receiving device 9 in FIG. 10 which are the same as those in the receiving device 5 according to the first embodiment are denoted with the same reference numeral. As illustrated in FIG. 10, the receiving device 9 includes the reception processing unit 51, demodulation demapping unit 52, decoding unit 53, average-of-absolute-values calculating unit 54, scale computing unit 56, and also a quantization range deciding unit 91, a quantization processing unit 92, a correction value computing unit 93, and a standard scale table 94.

The standard scale table 94 is a table where parameter I represents combinations of transmission formats such as transmission system, modulation format, and code rate, and a scale value $s_o$ in a case where the communication channel 4 is an AWGN communication channel is table value $T_s(I)$. In the present specification, the scale value $s_O$ for AWGN will be referred to as "standard scale value" for sake of convenience.

The standard scale $s_o$ is obtained by, for example, executing simulation using the values of table values $T_s(I)$ which may be candidates for the parameter I, and identifying a table value $T_s(I)$ exhibiting block error rate property deterioration which falls within a stipulated range. A standard quantization range $Y_{aO}(I)$ is obtained from a quantization position $r_{aO}(I)$ as to data regarding which the standard scale value $s_o$ has been obtained, by the averaging method in the following Expression (44).

$$Y_{a0}(I)=2^{r_{a0}(I)} \qquad (44)$$

The value of the standard quantization range $Y_{aO}(I)$ obtained by Expression (44) is held at the correction value computing unit 93.

The reception processing unit 51 executes reception processing of reception data signals received from the transmitting device 2 over the communication channel 4, according to the transmission format notified from the transmitting device 2, and generates reception symbols $r_i$. The reception processing unit 51 outputs the generated reception symbols to the demodulation demapping unit 52.

The demodulation demapping unit 52 receives the reception symbols $r_i$ transmitted from the reception processing unit 51. The demodulation demapping unit 52 then performs demodulating and demapping processing of the received reception symbols $r_i$ according to the transmission format notified from the transmitting device 2, thereby generating likelihood data $y_{ai}$. The demodulation demapping unit 52 transmits the generated likelihood data $y_{ai}$ to the average-of-absolute-values calculating unit 54 and the quantization processing unit 92.

The average-of-absolute-values calculating unit 54 receives the likelihood data $y_{ai}$ transmitted from the demodulation demapping unit 52. The average-of-absolute-values calculating unit 54 then calculates the average of absolute values of the received likelihood data $y_{ai}$, which is $<|y_{ai}|>$. The average-of-absolute-values calculating unit 54 then transmits the calculated average value $<|y_{ai}|>$ to the quantization range deciding unit 91.

The quantization range deciding unit 91 receives the $<|y_{ai}|>$, which is the average of absolute values of the likelihood data $y_{ai}$ transmitted from the average-of-absolute-values calculating unit 54. The quantization range deciding unit 91 then calculates the amplitude average value of the likelihood data $y_{ai}$ by the averaging method in Expression (45), and identifies the quantization range $Y_a$ of the likelihood data $y_{ai}$.

$$Y_a=2^{r_a}$$

$$r_a=\log_2(\mathrm{mag}\langle y_{ai}|\rangle) \qquad (45)$$

The quantization range deciding unit 91 transmits the value of the quantization range $Y_a$ of the likelihood data $y_{ai}$ that has been identified to the quantization processing unit 92 and the correction value computing unit 93.

The quantization processing unit 92 receives the likelihood data $y_{ai}$ transmitted from the demodulation demapping unit 52, and receives the value of the quantization range $Y_a$ that has been transmitted from the quantization range deciding unit 91. The quantization processing unit 92 quantizes the received likelihood data $y_{ai}$ so as to be within the received quantization range $Y_a$, and transmits the quantized likelihood data $y_{ai}$ to the decoding unit 53.

The correction value computing unit 93 receives the value of the quantization range $Y_a$ transmitted from the quantization range deciding unit 91. The correction value computing unit 93 calculates the ratio between the received quantization range $Y_a$ and the held standard quantization range $Y_{aO}(I)$, and obtains a correction value $r_m$ based on the difference between the quantization ranges, as in Expression (46).

$$r_m = \frac{Y_a}{Y_{a0}(I)} \qquad (46)$$

The correction value computing unit 93 transmits the obtained correction value $r_m$ to the scale computing unit 56.

The standard scale table 94 transmits a standard scale value $s_o$ matching the transmission format notified from the transmitting device 2, to the scale computing unit 56.

The scale computing unit 56 receives correction value $r_m$ transmitted from the correction value computing unit 93 and the standard scale $s_o$ transmitted from the standard scale table 94. The scale computing unit 56 then multiples the received correction value $r_m$ by the standard scale $s_o$ to compute the scale value $s_c$, as in the following Expression (47).

$$s_c=s_o r_m \qquad (47)$$

The scale computing unit 56 transmits the computed scale value $s_c$ to the decoding unit 53.

This, the scale value obtaining processing according to the second embodiment is executed by the average-of-absolute-values calculating unit 54, quantization range deciding unit 91, correction value computing unit 93, standard scale table 94, and scale computing unit 56 and so forth. Now, an arrangement may be made wherein, in the case that the transmission format notified from the transmitting device 2 is multilevel modulation, scale value obtaining processing according to the second embodiment is performed as to likelihood data $y_{ai}$ of the head bit of each received symbol mapped to the complex plane (signal space). Alternatively, an arrangement may be made where the scale value obtaining processing is performed on transport blocks received each reception sub frame. That is to say, an arrangement may be made where the same scale value $s_c$ is applied to each transport block.

The decoding unit 53 receives the likelihood data $y_{ai}$ transmitted from the quantization processing unit 92 and the scale value $s_c$ transmitted from the scale computing unit 56. The decoding unit 53 performs error-correction decoding processing on the likelihood data $y_{ai}$ using the received scale value $s_c$, according to the transmission format notified from the transmitting device 2. Specific error-correction decoding processing by the decoding unit 53 may be the same as the processing described above regarding the receiving device 5 according to the first embodiment.

Figure 11:
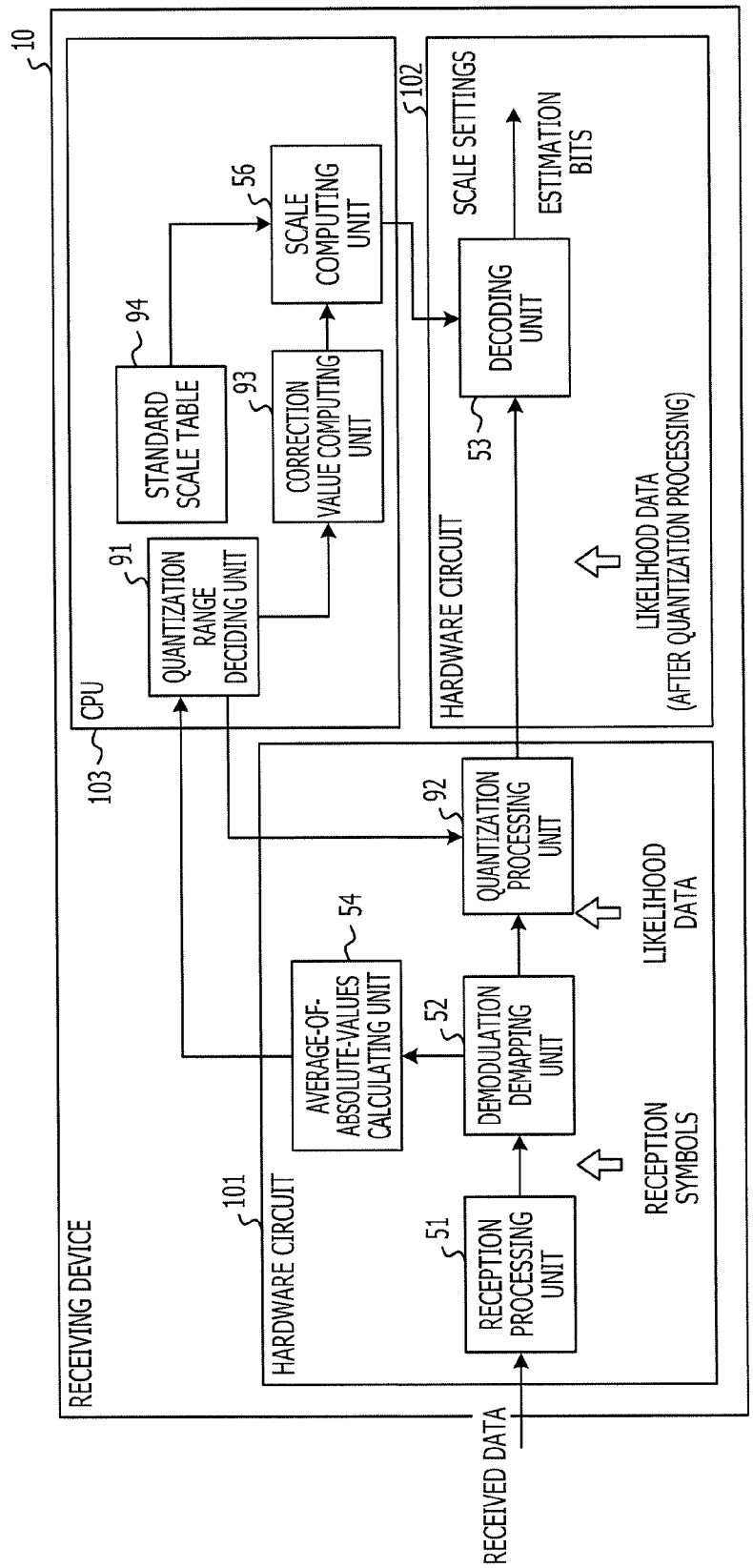
FIG. 11 is an exemplary hardware configuration diagram of a receiving device according to the second embodiment.

FIG. 11 is an exemplary hardware configuration diagram of a receiving device according to the second embodiment. The example illustrated in FIG. 11 is a configuration where the reception processing unit 51, demodulation demapping unit 52, average-of-absolute-values calculating unit 54, and quantization processing unit 92 are implemented by a hardware circuit 101 of a receiving device 10, while the decoding unit 53 is implemented by a separate hardware circuit 102. The quantization range deciding unit 91, correction value computing unit 93, standard scale table 94, and scale computing unit 56 are implemented by a CPU 103. Note that the hardware configuration illustrated in FIG. 11 is but an example, and that the receiving device 9 may be implemented by any device and any hardware circuit which may carry out the reception method according to the second embodiment.

An example of "any device" besides a CPU is a DSP. Examples of "any hardware circuit" include an ASIC, an FPGA, and a VLSI.

Figure 12:
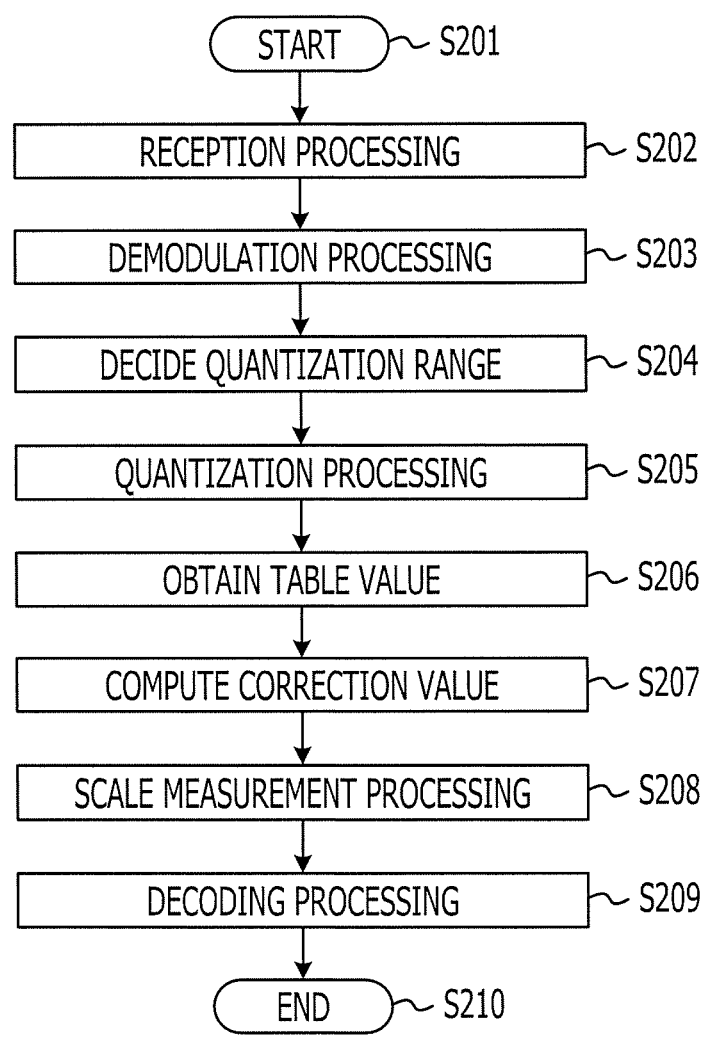
FIG. 12 is an exemplary flowchart of decoding processing by the receiving device according to the second embodiment.

An example of the reception data decoding method by the receiving device 9 according to the second embodiment will be described with reference to FIG. 12. FIG. 12 is an exemplary flowchart of decoding processing by the receiving device according to the second embodiment.

Upon having received data signals transmitted from the transmitting device 2 by the reception processing unit 51, a series of decoding processing by the receiving device 9 is started (step S201). The reception processing unit 51 performs reception processing such as synchronous detection on the reception data, and generates reception symbols $r_i$ represented in the format of points in signal space (step S202). The reception processing unit 51 transmits the generated reception symbols $r_i$ to the demodulation demapping unit 52.

The demodulation demapping unit 52 receives the reception symbols $r_i$ transmitted from the reception processing unit 51. The demodulation demapping unit 52 then subjects the received reception symbols $r_i$ to demodulating processing in accordance with the transmission format notified from the transmitting device 2, and generates likelihood data $y_{ai}$ (step S203). The demodulation demapping unit 52 transmits the generated likelihood data $y_{ai}$ to the average-of-absolute-values calculating unit 54 and the quantization processing unit 92.

The average-of-absolute-values calculating unit 54 receives the likelihood data $y_{ai}$ transmitted from the demodulation demapping unit 52. The average-of-absolute-values calculating unit 54 then calculates the average of absolute values of the received likelihood data $y_{ai}$. The average-of-absolute-values calculating unit 54 transmits the calculated average value $<|y_{ai}|>$ to the quantization range deciding unit 91.

The quantization range deciding unit 91 receives the average of absolute values of the likelihood data $<|y_{ai}|>$ transmitted from the average-of-absolute-values calculating unit 54. The quantization range deciding unit 91 then calculates the amplitude average value of the likelihood data $y_{ai}$ and identifies the quantization range $Y_a$ of the likelihood data $y_{ai}$ according to the transmission format notified from the transmitting device 2 (step S204). The quantization range deciding unit 91 transmits the value of the quantization range $Y_a$ of the likelihood data $y_{ai}$ that has been identified to the quantization processing unit 92 and the correction value computing unit 93.

The quantization processing unit 92 receives the likelihood data $y_{ai}$ transmitted from the demodulation demapping unit 52, and receives the value of the quantization range $Y_a$ that has been transmitted from the quantization range deciding unit 91. The quantization processing unit 92 quantizes the received likelihood data $y_{ai}$ so as to be within the received quantization range $Y_a$ (step S205), and transmits the quantized likelihood data $y_a$, to the decoding unit 53.

The standard scale table 94 transmits the standard scale $s_o$ matching the transmission format notified from the transmitting device 2, to the scale computing unit 56 (step S206).

The correction value computing unit 93 receives the value of the quantization range $Y_a$ from the quantization range deciding unit 91. The correction value computing unit 93 calculates the ratio between the received quantization range $Y_a$ and the held standard quantization range $Y_{aO}(I)$, and obtains the correction value $r_m$ based on the difference between the quantization ranges (step S207). The correction value computing unit 93 then transmits the obtained correction value $r_m$ to the scale computing unit 56.

The scale computing unit 56 receives the correction value $r_m$ transmitted from the correction value computing unit 93 and the standard scale $s_o$ transmitted from the standard scale table 94. The scale computing unit 56 then multiples the received correction value $r_m$ by the standard scale $s_o$ to compute the standard scale $s_o$ (step S208). The scale computing unit 56 then transmits the computed scale value $s_c$ to the decoding unit 53.

The decoding unit 53 receives the likelihood data $y_{ai}$ transmitted from the quantization processing unit 92 and the scale value $s_c$ transmitted from the scale computing unit 56. The decoding unit 53 performs error-correction decoding on the received likelihood data $y_{ai}$ using the scale value $s_c$, according to the transmission format notified from the transmitting device 2 (step S209).

Upon the decoded bits estimating the information bits transmitted from the transmitting device 2 being obtained by the decoding processing in step S209, the series of decoding processing on the reception data ends (step S210).

Thus, the receiving device 9 according to the second embodiment performs decoding processing by adjusting the implementation scale likelihood data $y_{ai}$ by a scale value $s_c$ according to a predetermined transmission format, in a case where the implementation scale likelihood data $Y_{ai}$ has been quantized within an optional quantization range corresponding to the wireless communication quality. Thus, according to the receiving device according to the second embodiment, decoded bits may be generated from implementation scale likelihood data with low code error rate, in accordance with difference in transmission formats such as transmission system, modulation format, code rate, and so forth.

Third Embodiment

A receiving device according to a third embodiment performs decoding processing of implementation scale likelihood data using a LOG-MAP linear approximation algorithm adjusted by a scale value corresponding to a predetermined transmission format and performs decoding processing, in a case where the implementation scale likelihood data has been quantized within an optional quantization range corresponding to the wireless communication quality.

Figure 13:
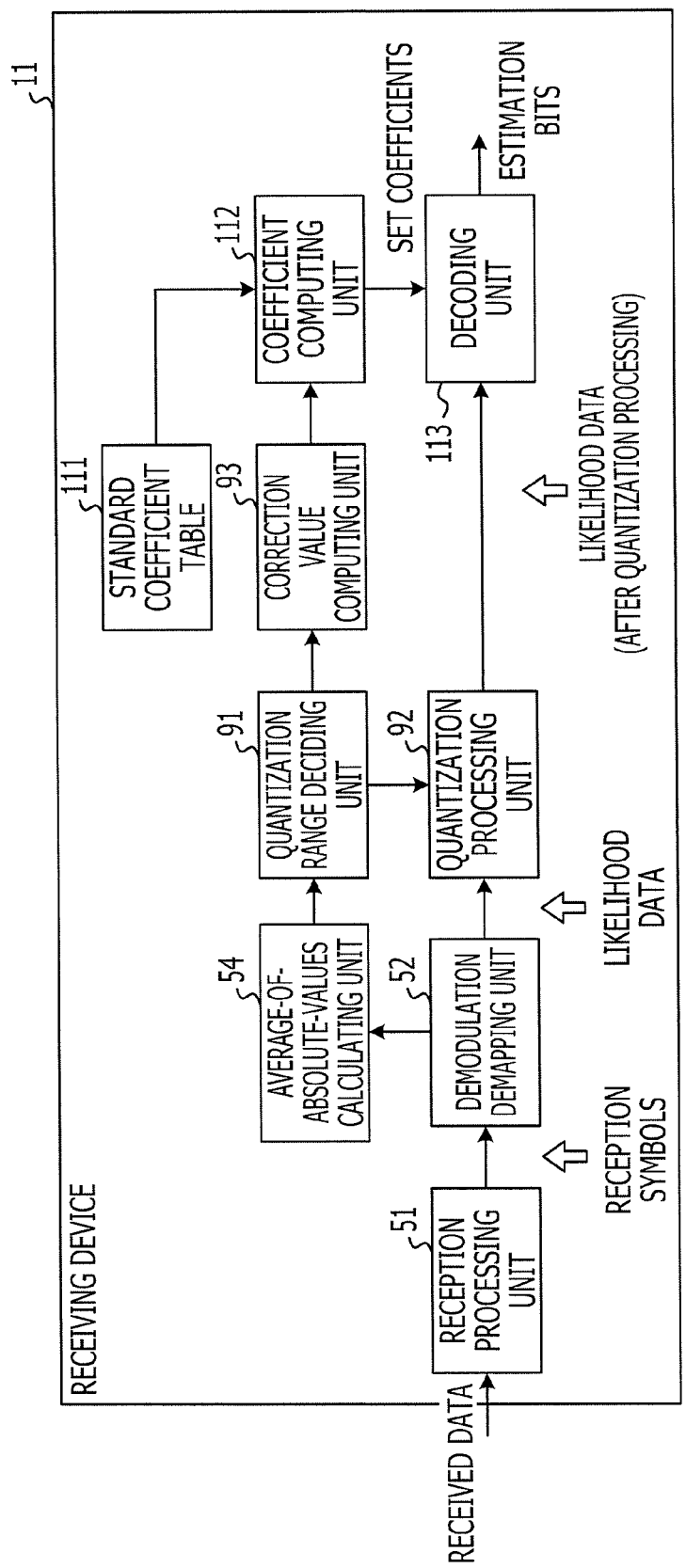
FIG. 13 is a schematic functional configuration diagram of a receiving device according to a third embodiment.

FIG. 13 is a schematic functional configuration diagram of a receiving device according to the third embodiment. A receiving device 11 according to the third embodiment illustrated in FIG. 13 may be included in the wireless communication system 1 instead of the receiving device 3, to receive data signals transmitted from the transmitting device 2 which is a device at the other end, and demodulate and decode the received data signals. Components of the receiving device 11 in FIG. 13 which are the same as those in the receiving device 5 and the receiving device 9 are denoted with the same reference numeral. As illustrated in FIG. 13, the receiving device 11 includes the reception processing unit 51, demodulation demapping unit 52, average-of-absolute-values calculating unit 54, quantization range deciding unit 91, quantization processing unit 92, correction value computing unit 93, and also a standard coefficient table 111, a coefficient computing unit 112, and a decoding unit 113.

The decoding unit 113 may execute turbo decoding such as described above as error-correction decoding processing. The configuration of the turbo decoder included in the decoding unit 113 may be the same as the configuration illustrated in FIG. 6, for example. A LOG-MAP linear approximation algorithm is used in the processing by the constituent decoders 71 and 72.

A LOG-MAP linear approximation algorithm is an algorithm for linear approximation of the correction term in a LOG-MAP algorithm. As described earlier, the correction term in the LOG-MAP algorithm is the logarithmic function indicated by the MAX* operation in Expressions (29) and (32), and is the correction function f(x) expressed in Expression (40) described earlier. As one example, the third embodiment approximates the correction function f(x) by a linear approximation function $f_L(x)$ such as in the following Expression (48).

$$f(x) \approx f_L(x) = \max(b-ax, 0) \tag{48}$$

Figure 14:
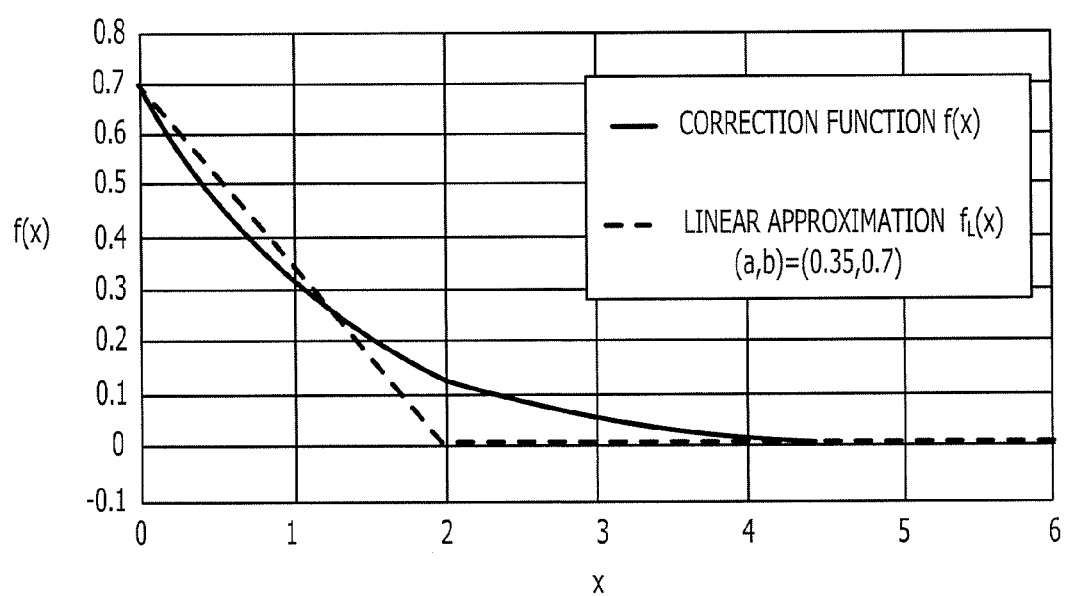
FIG. 14 is an exemplary diagram of a correction function f(x) and linear approximation function $f_L(x)$.

The a and b in Expression (48) are coefficients of the linear approximation function $f_L(x)$, where the coefficient b is a zero-order coefficient unrelated to the variable x. For example, in a case where the values of the coefficients a and b have been selected such that (a, b)=(0.35, 0.7), the correction coefficient f(x) and linear approximation function $f_L(x)$ may be expressed such as illustrated in FIG. 14. FIG. 14 is an exemplary diagram of the correction coefficient f(x) and linear approximation function $f_L(x)$.

We will say that $f_{aL}(x_a)$ is the implementation scale linear approximation function in a predetermined transmission format decided according to the wireless communication quality on the communication channel 4 between the transmitting device 2 and the receiving device 11. The decoding unit 113 according to the third embodiment may adjust the implementation scale likelihood data $y_{ai}$ to the standard scale by performing scale adjustment of the linear approximation function $f_{aL}(x)$ instead of correcting the implementation scale likelihood data $y_{ai}$ by the scale value $s_c$ in Expression (28). In the case of correcting the linear approximation function $f_{aL}(x)$ by the scale value $s_c$, the linear approximation function $f_{aL}(x)$ is expressed as in the following Expression (49).

$$f_a(x_a) \approx f_{aL}(x_a) = s_c \max(b - ax_a/s_c, 0) \tag{49}$$
$$= \max(bs_c - ax_a, 0)$$
$$= \max(b_a - ax_a, 0)$$

The zero-order coefficient $b_a$ of the implementation scale linear approximation function $f_{aL}(x_a)$ in Expression (49) is an unknown value. Accordingly, the receiving device 11 according to the third embodiment holds the zero-order coefficient $b_O$ of the standard scale linear approximation function $f_L(x)$ beforehand, and executes decoding processing using the implementation scale likelihood data $y_{ai}$ by scale-adjusting the zero-order coefficient $b_O$. Specifically, the receiving device 11 includes the following configuration.

The standard coefficient table 111 is a table where parameter I represents combinations of transmission formats such as transmission system, modulation format, and code rate, and a coefficient $b_O$ of the linear approximation function $f_L(x)$ in a case where the communication channel 4 is an AWGN communication channel is table value $T_b(I)$. In the present specification, the scale value $b_O$ for AWGN will be referred to as "standard scale coefficient" for sake of convenience.

The standard scale coefficient $b_O$ is obtained by, for example, executing simulation using the values of table values $T_b(I)$ which may be candidates for the parameter I, and identifying a table value $T_b(I)$ exhibiting block error rate property deterioration which falls within a stipulated range. A standard quantization range $Y_{aO}(I)$ is obtained from a quantization position $r_{aO}(I)$ as to data regarding which the standard scale coefficient $b_o$ has been obtained. The value of the standard quantization range $Y_{aO}(I)$ thus obtained is held at the correction value computing unit 93.

The standard coefficient table 111 transmits the standard scale coefficient $b_O$ matching the transmission format notified from the transmitting device 2, to the coefficient computing unit 112.

The coefficient computing unit 112 receives the correction value $r_m$ transmitted from the correction value computing unit 93 and the standard scale coefficient $b_O$ transmitted from the standard coefficient table 111. The coefficient computing unit 112 then multiples the received correction value $r_m$ by the standard scale coefficient $b_O$ and obtains the zero-order coefficient $b_a$ of the implementation scale linear approximation function $f_{aL}(x_a)$, as in the following Expression (50).

$$b_a = b_O r_m \tag{50}$$

The coefficient computing unit 112 then transmits the computed zero-order coefficient $b_a$ to the decoding unit 113.

Thus, the scale value obtaining processing according to the third embodiment is executed by the average-of-absolute-values calculating unit 54, quantization range deciding unit 91, correction value computing unit 93, standard coefficient table 111, and coefficient computing unit 112 and so forth. Now, an arrangement may be made wherein, in the case that the transmission format notified from the transmitting device 2 is multilevel modulation, scale value obtaining processing according to the third embodiment is performed as to likelihood data $y_{ai}$ of the head bit of each received symbol mapped to the complex plane (signal space). Alternatively, an arrangement may be made where the scale value obtaining processing is performed on transport blocks received each reception sub frame. That is to say, an arrangement may be made where the same scale value $s_c$ is applied to each transport block.

The decoding unit 113 receives the likelihood data $y_{ai}$ transmitted from the quantization processing unit 92 and the zero-order coefficient $b_O$ transmitted from the coefficient computing unit 112. The decoding unit 113 generates decoded bits by performing turbo decoding processing of the received likelihood data $y_{ai}$ by the LOG-MAP linear approximation algorithm using the received zero-order coefficient $b_a$, according to the transmission format notified from the transmitting device 2.

Figure 15:
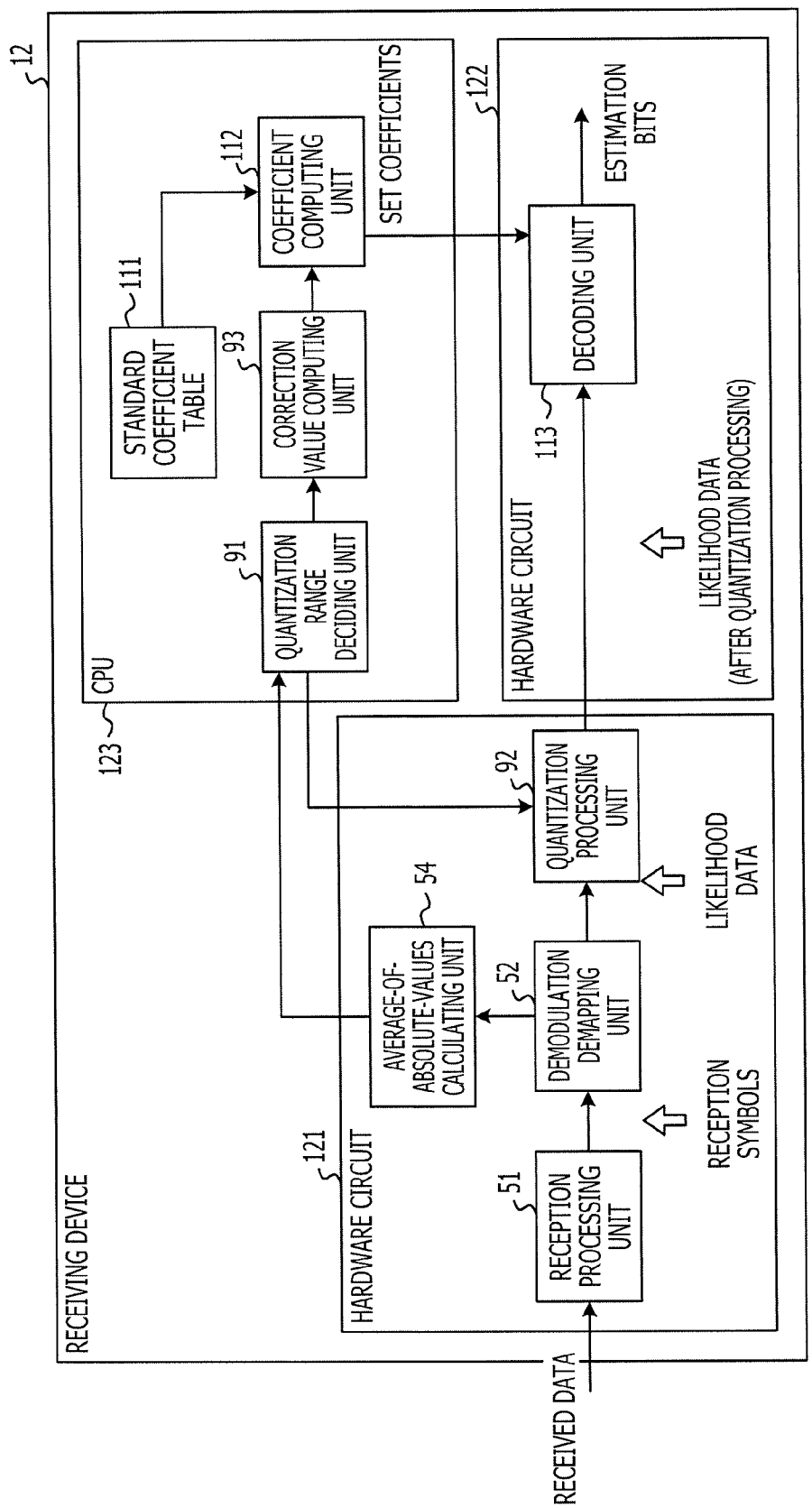
FIG. 15 is an exemplary hardware configuration diagram of a receiving device according to the third embodiment.

FIG. 15 is an exemplary hardware configuration diagram of a receiving device according to the third embodiment. The example illustrated in FIG. 15 is a configuration where the reception processing unit 51, demodulation demapping unit 52, average-of-absolute-values calculating unit 54, and quantization processing unit 92 are implemented by a hardware circuit 121 of a receiving device 12, while the decoding unit 113 is implemented by a separate hardware circuit 122. The quantization range deciding unit 91, correction value computing unit 93, standard coefficient table 111, and coefficient computing unit 112 are implemented by the CPU 103. Note that the hardware configuration illustrated in FIG. 15 is but an example, and that the receiving device 12 may be implemented by any device and any hardware circuit which may carry out the reception method according to the third embodiment.

Figure 16:
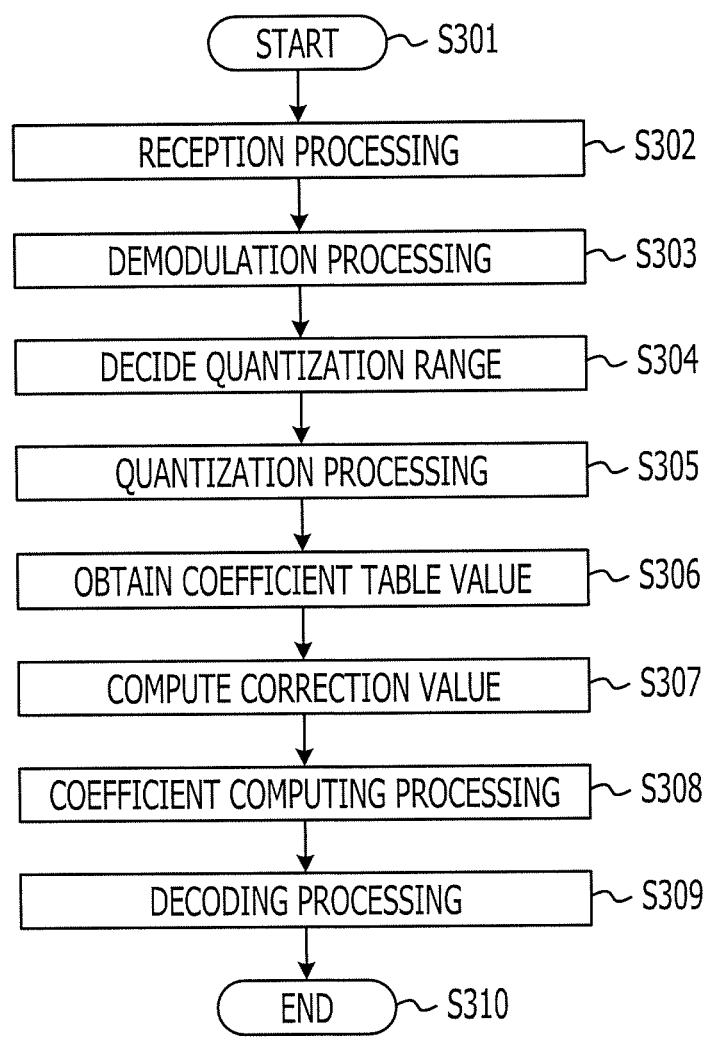
FIG. 16 is an exemplary flowchart of decoding processing by the receiving device according to the third embodiment.

An example of the decoding method by the receiving device 11 according to the third embodiment will be described with reference to FIG. 16. FIG. 16 is an exemplary flowchart of decoding processing by the receiving device according to the third embodiment.

Upon having received data signals transmitted from the transmitting device 2 by the reception processing unit 51, a series of decoding processing by the receiving device 11 is started (step S301). The reception processing unit 51 performs reception processing on the reception data, and generates reception symbols $r_i$ represented in the format of points in signal space (step S302). The reception processing unit 51 transmits the generated reception symbols $r_i$ to the demodulation demapping unit 52.

The demodulation demapping unit 52 receives the reception symbols $r_i$ transmitted from the reception processing unit 51. The demodulation demapping unit 52 then subjects the received reception symbols $r_i$ to demodulating processing in accordance with the transmission format notified from the transmitting device 2, and generates likelihood data $y_{ai}$ (step S303). The demodulation demapping unit 52 transmits the generated likelihood data $y_{ai}$ to the average-of-absolute-values calculating unit 54 and the quantization processing unit 92.

The average-of-absolute-values calculating unit 54 receives the likelihood data $y_{ai}$ transmitted from the demodulation demapping unit 52. The average-of-absolute-values calculating unit 54 then calculates the average of absolute values of the received likelihood data $y_{ai}$. The average-of-absolute-values calculating unit 54 transmits the calculated average value $<|y_{ai}|>$ to the quantization range deciding unit 91.

The quantization range deciding unit 91 receives the average of absolute values of the likelihood data $<|y_{ai}|>$ transmitted from the average-of-absolute-values calculating unit 54. The quantization range deciding unit 91 then calculates the amplitude average value of the likelihood data $y_{ai}$ and identifies the quantization range $Y_a$ of the likelihood data $y_{ai}$ according to the transmission format notified from the transmitting device 2 (step S304). The quantization range deciding unit 91 transmits the value of the quantization range $Y_a$ of the likelihood data $y_{ai}$ that has been identified to the quantization processing unit 92 and the correction value computing unit 93.

The quantization processing unit 92 receives the likelihood data $y_{ai}$ transmitted from the demodulation demapping unit 52, and receives the value of the quantization range $Y_a$ that has been transmitted from the quantization range deciding unit 91. The quantization processing unit 92 quantizes the received likelihood data $y_{ai}$ so as to be within the received quantization range $Y_a$ (step S305), and transmits the quantized likelihood data $y_{ai}$ to the decoding unit 113.

The standard coefficient table 111 transmits the standard zero-order coefficient $b_O$ matching the transmission format notified from the transmitting device 2, to the coefficient computing unit 112 (step S306).

The correction value computing unit 93 receives the value of the quantization range $Y_a$ from the quantization range deciding unit 91. The correction value computing unit 93 calculates the ratio between the received quantization range $Y_a$ and the held standard quantization range $Y_{aO}(I)$, and obtains the correction value $r_m$ based on the difference between the quantization ranges (step S307). The correction value computing unit 93 the transmits the obtained correction value $r_m$ to the coefficient computing unit 112.

The coefficient computing unit 112 receives the correction value $r_m$ transmitted from the correction value computing unit 93 and the standard zero-order coefficient $b_O$ transmitted from the standard coefficient table 111. The coefficient computing unit 112 then multiples the received correction value $r_m$ by the standard scale coefficient $b_O$ to compute the implementation scale zero-order coefficient $b_a$ (step S308). The coefficient computing unit 112 then transmits the computed zero-order coefficient $b_a$ to the decoding unit 113.

The decoding unit 113 receives the likelihood data $y_{ai}$ transmitted from the quantization processing unit 92 and the zero-order coefficient $b_a$ transmitted from the coefficient computing unit 112. The decoding unit 113 performs turbo decoding processing on the received likelihood data $y_{ai}$ by a LOG-MAP linear approximation algorithm, using the received zero-order coefficient $b_a$, according to the transmission format notified from the transmitting device 2 (step S309).

Upon the decoded bits estimating the information bits transmitted from the transmitting device 2 being obtained by the decoding processing in step S309, the series of decoding processing on the reception data ends (step S310).

Thus, the receiving device 11 according to the third embodiment performs scale-adjusting of the implementation scale likelihood data $y_{ai}$ and turbo decoding by a LOG-MAP linear approximation algorithm. Accordingly, the receiving device according to the third embodiment may generate decoded bits with low code error rate, faster than by the receiving devices according to the first and second embodiments.

Fourth Embodiment

The reception devices according to the first through third embodiments may perform obtaining processing of a scale value to correct likelihood data of an implementation scale to that of a standard scale, with regard to received transport blocks.

However, in a case where a transport block is divided into multiple code blocks (CB), an arrangement may be made where the processing to obtaining the scale value by the reception devices according to the first through third embodiments is executed on the head code block making up the transport block.

Figure 17:
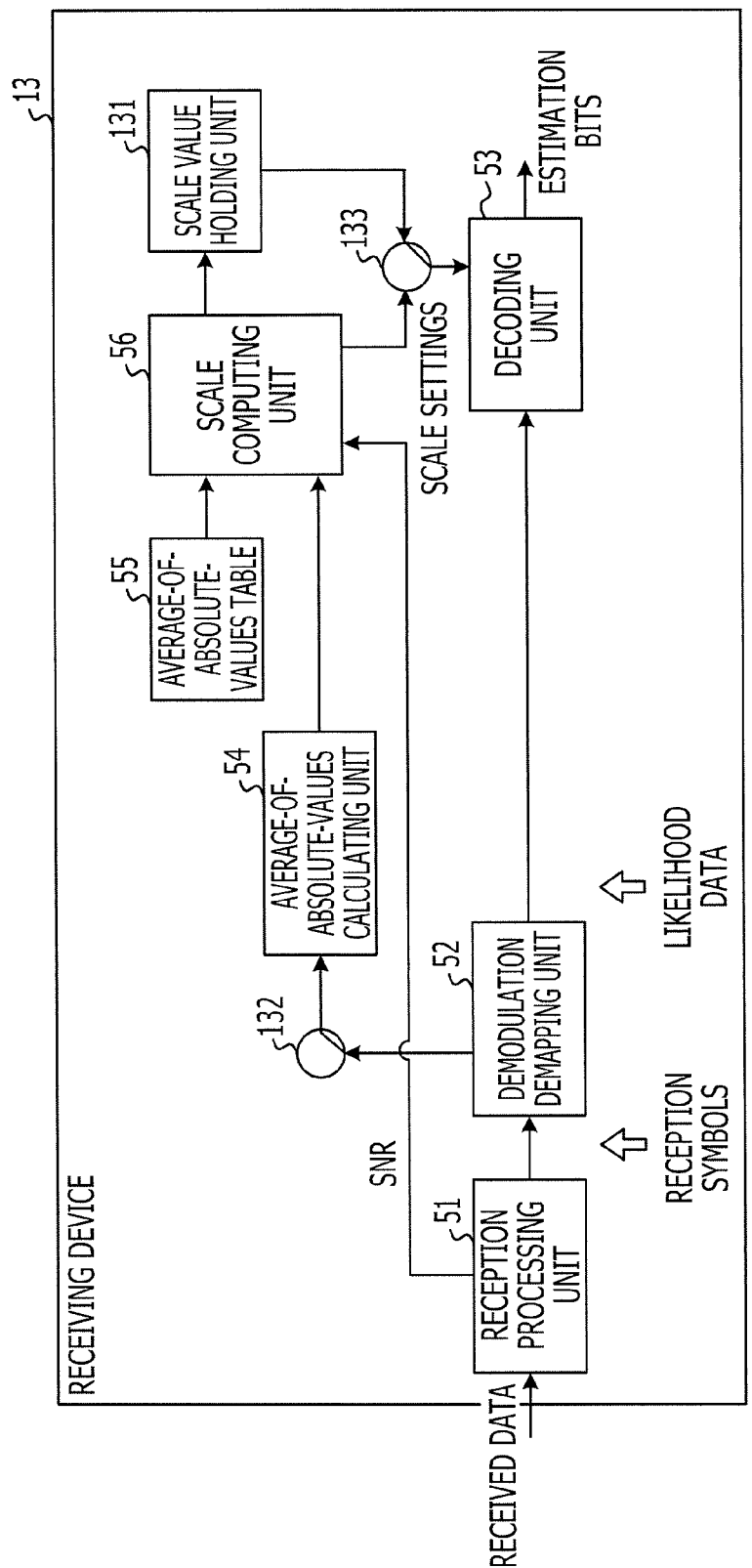
FIG. 17 is a schematic functional configuration diagram of a receiving device according to a fourth embodiment.

FIG. 17 is a schematic functional configuration diagram of a receiving device according to a fourth embodiment. FIG. 17 illustrates an example of a receiving device 13 according to the fourth embodiment, configured such that scale value obtaining processing by the receiving device 5 may be performed in increments of head code blocks. Configurations regarding the receiving device 9 and receiving device 11 will also be clear from the following description regarding the receiving device 13.

Components of the receiving device 13 in FIG. 17 which are the same as those in the receiving device 5 are denoted with the same reference numeral. As illustrated in FIG. 17, the receiving device 13 includes the reception processing unit 51, demodulation demapping unit 52, decoding unit 53, average-of-absolute-values calculating unit 54, average-of-absolute-values table 55, scale computing unit 56, and a scale value holding unit 131, a first CB switchover switch 132, and a second CB switchover switch 133.

In a case where a head code block making up a transport block is detected, the first CB switchover switch 132 connects the demodulation demapping unit 52 and average-of-absolute-values calculating unit 54. Upon being connected by the first CB switchover switch 132, the average-of-absolute-values calculating unit 54 receives the likelihood data $y_{ai}$ generated by the above-described processing from the demodulation demapping unit 52. Thereafter, the scale computing unit 56 computes the scale value $s_c$ according to computation processing such as described above. The scale computing unit 56 then transmits the scale value $s_c$ obtained by the computation processing such as described above to the scale value holding unit 131. The scale value holding unit 131 receives the scale value $s_c$ transmitted from the scale computing unit 56, and holds the received scale value $s_c$.

Also, in a case where a head code block making up a transport block is detected, the second CB switchover switch 133 connects the scale computing unit 56 and the decoding unit 53. Upon being connected by the second CB switchover switch 133, the scale computing unit 56 transmits the computed scale value $s_c$ to the decoding unit 53. The decoding unit 53 receives the scale value $s_c$ transmitted from the scale value holding unit 131, and uses the received scale value $s_c$ to perform decoding processing such as described above.

On the other hand, in the event that a code block other than the head code block making up the transport block is detected, the first CB switchover switch 132 cuts off the connection between the demodulation demapping unit 52 and the average-of-absolute-values calculating unit 54. When cut off by the first CB switchover switch 132, the average-of-absolute-values calculating unit 54 does not receive generated likelihood data $y_{ai}$ from the demodulation demapping unit 52. Accordingly, processing to obtain the scale value $s_c$ such as described above is not executed.

Also, in the event that a code block other than the head code block making up the transport block is detected, the second CB switchover switch 133 connects the scale value holding unit 131 and the decoding unit 53. When connected by the second CB switchover switch 133, the scale value holding unit 131 transmits the scale value $s_c$ held therein to the decoding unit 53. The decoding unit 53 receives the scale value $s_c$ transmitted from the scale value holding unit 131, and executes decoding processing such as described above using the received scale value $s_c$.

Figure 18:
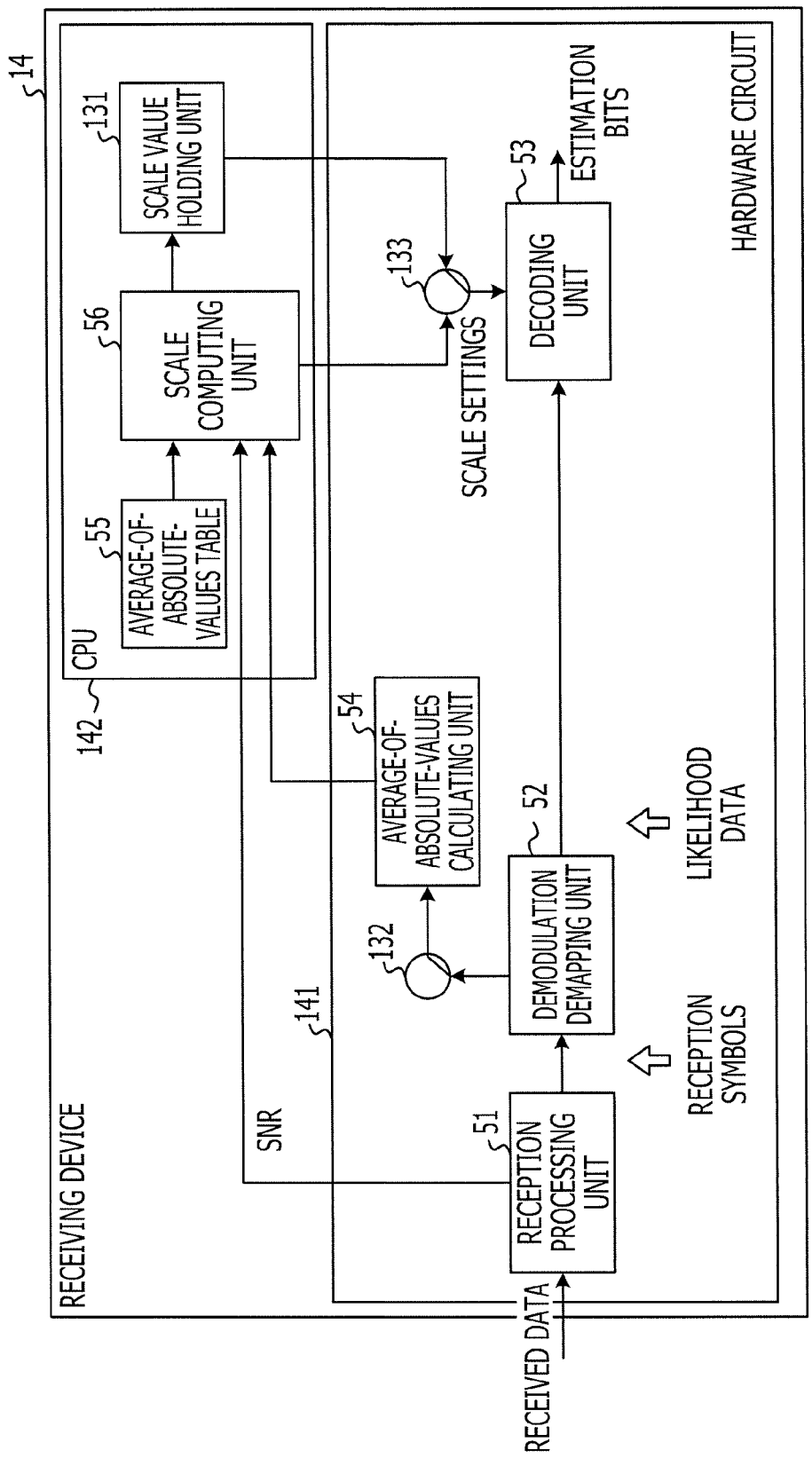
FIG. 18 is an exemplary hardware configuration diagram of a receiving device according to the fourth embodiment.

FIG. 18 is an exemplary hardware configuration diagram of a receiving device according to the fourth embodiment. The example illustrated in FIG. 18 is a configuration where the reception processing unit 51, demodulation demapping unit 52, decoding unit 53, average-of-absolute-values calculating unit 54, first CB switchover switch 132, and second CB switchover switch 133 are implemented by a hardware circuit 141 of a receiving device 14. The average-of-absolute-values table 55, scale computing unit 56, and scale value holding unit 131 are implemented by a CPU 142. Note that the hardware configuration illustrated in FIG. 18 is but an example, and that the receiving device 13 may be implemented by any device and any hardware circuit which may carry out the reception method according to the fourth embodiment.

Figure 19:
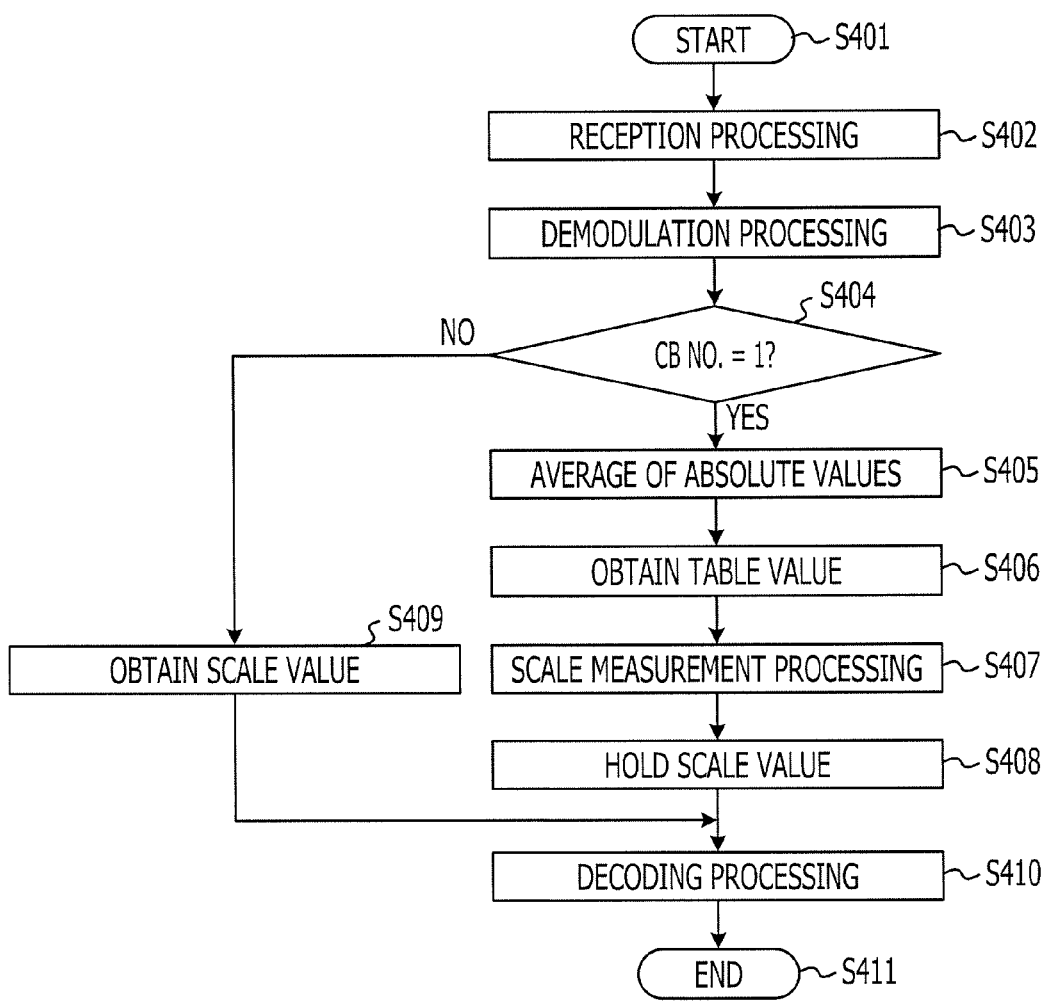
FIG. 19 is an exemplary flowchart of decoding processing by the receiving device according to the fourth embodiment.

An example of the reception data decoding method by the receiving device 13 according to the fourth embodiment will be described with reference to FIG. 19. FIG. 19 is an exemplary flowchart of decoding processing by the receiving device according to the fourth embodiment.

Upon having received data signals transmitted from the transmitting device 2 by the reception processing unit 51, a series of decoding processing by the receiving device 13 is started (step S401). The reception processing unit 51 performs reception processing on the reception data, and generates reception symbols $r_i$ represented in the format of points in signal space (step S402). The reception processing unit 51 transmits the generated reception symbols $r_i$ to the demodulation demapping unit 52. The reception processing unit 51 also measures SNR as to the received data, and transmits the measured SNR value to the scale computing unit 56.

The demodulation demapping unit 52 receives the reception symbols n transmitted from the reception processing unit 51. The demodulation demapping unit 52 then subjects the received reception symbols $r_i$ to demodulating processing in accordance with the transmission format notified from the transmitting device 2, and generates likelihood data $y_{ai}$ (step S403). The demodulation demapping unit 52 transmits the generated likelihood data $y_{ai}$ to the decoding unit 53.

In a case where "1", which represents the head code block, is detected from the code block No. of a code block being processed ("Yes" in step S404), the first CB switchover switch 132 connects the demodulation demapping unit 52 and the average-of-absolute-values calculating unit 54. The average-of-absolute-values calculating unit 54 receives the generated likelihood data $y_{ai}$ from the demodulation demapping unit 52. Also, the second CB switchover switch 133 connects the scale computing unit 56 and the decoding unit 53. The flow then proceeds to step S405.

Processing the same as that described in steps S104 through S106 is performed in steps S405 through S407, and the scale value $s_c$ is obtained by the scale computing unit 56. The scale computing unit 56 transmits the computed scale value $s_c$ to the scale value holding unit 131 and the decoding unit 53. The scale value holding unit 131 holds the scale value $s_c$ transmitted from the scale computing unit 56 (S408). The flow then proceeds to step S410.

On the other hand, in a case where a value other than "1" is detected from the code block No. of a code block being processed ("No" in step S404), the first CB switchover switch 132 cuts off the connection between the demodulation demapping unit 52 and average-of-absolute-values calculating unit 54. Also, the second CB switchover switch 133 connects the scale value holding unit 131 and the decoding unit 53. The flow then proceeds to step S409.

In step S409, the scale value holding unit 131 transmits the scale value $s_c$ held therein to the decoding unit 53. The flow then proceeds to step S410.

In step S410, the decoding unit 53 receives the likelihood data $y_{ai}$ transmitted from the demodulation demapping unit 52. The decoding unit 53 also receives the scale value $s_c$ from either the scale computing unit 56 or the scale value holding unit 131. The decoding unit 53 then executes the decoding processing the same as that described in step S107.

Upon the decoded bits estimating the information bits transmitted from the transmitting device 2 being obtained by the decoding processing in step S410, the series of decoding processing on the reception data ends (step S411).

Thus, the receiving device 13 according to the fourth embodiment performs decoding processing by converting the implementation scale likelihood data $y_{ai}$ into standard scale, using the scale value $s_c$ obtained regarding the head code block making up a transport block. Accordingly, the receiving device according to the fourth embodiment may yield the same advantages as the receiving devices according to the first through third embodiments, and further, costs relating to the processing to obtain the scale value may be reduced.

Fifth Embodiment

The receiving devices according to the first through third embodiments may execute processing to obtain a scale value with regard to received transport blocks. Also, the receiving device according to the fourth embodiment may execute processing to obtain a scale value with regard to the head code block of a transport block.

Note however, that the processing to obtain a scale value according to the first through fourth embodiments may be executed each time the transmission format of received transport blocks changes.

Figure 20:
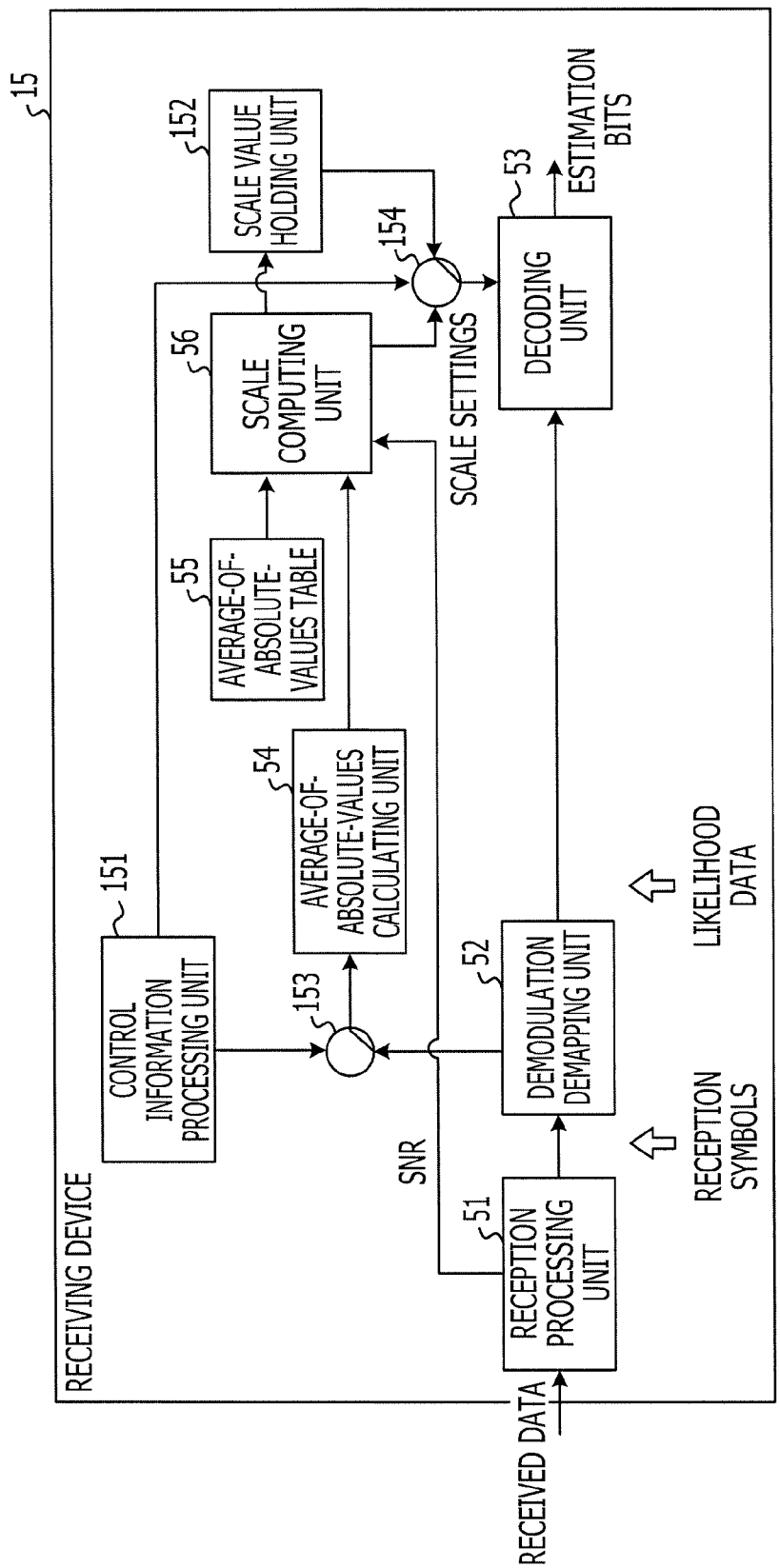
FIG. 20 is a schematic functional configuration diagram of a receiving device according to a fifth embodiment.

FIG. 20 is a schematic functional configuration diagram of a receiving device according to a fifth embodiment. FIG. 20 illustrates an example of a receiving device 15 according to the fifth embodiment, configured such that scale value obtaining processing by the receiving device 5 may be performed each time the transmission format changes. Configurations regarding the receiving device 9, receiving device 11, and receiving device 13 will also be clear from the following description regarding the receiving device 15.

Components of the receiving device 15 in FIG. 20 which are the same as those in the receiving device 5 are denoted with the same reference numerals. As illustrated in FIG. 20, the receiving device 15 includes the reception processing unit 51, demodulation demapping unit 52, decoding unit 53, average-of-absolute-values calculating unit 54, average-of-absolute-values table 55, scale computing unit 56, and a control information processing unit 151, a scale value holding unit 152, a measurement executing switch 153, and a scale value changing switch 154.

The control information processing unit 151 receives control information including the transmission format from the transmitting device 2. Control information including the transmission format is transmitted from the transmitting device 2 to the control information processing unit 151 over the PDCCH, for example.

In a case where the transmission format included in the received control information is different from the transmission format already received, the control information processing unit 151 operates the measurement executing switch 153 so as to connect the demodulation demapping unit 52 and the average-of-absolute-values calculating unit 54. Upon the measurement executing switch 153 being operated, the average-of-absolute-values calculating unit 54 receives the likelihood data $y_{ai}$ generated by the above-described processing from the demodulation demapping unit 52. Thereafter, the scale computing unit 56 computes the scale value $s_c$ according to computation processing such as described above. The scale computing unit 56 then transmits the computed scale value $s_c$ to the scale value holding unit 152. The scale value holding unit 152 receives the scale value $s_c$ transmitted from the scale computing unit 56, and holds the received scale value $s_c$.

Also, in a case where the transmission format included in the received control information is different from the transmission format already received, the control information processing unit 151 operates the scale value changing switch 154 so as to connect the scale computing unit 56 and the decoding unit 53. Upon the scale value changing switch 154 being operated, the scale computing unit 56 transmits the computed scale value $s_c$ to the decoding unit 53. The decoding unit 53 receives the scale value $s_c$ transmitted from the scale value holding unit 152, and uses the received scale value $s_c$ to perform decoding processing such as described above.

On the other hand, in a case where the transmission format included in the received control information is the same as the transmission format already received, the control information processing unit 151 operates the measurement executing switch 153 to cut off the connection between the demodulation demapping unit 52 and the average-of-absolute-values calculating unit 54. When the measurement executing switch 153 is operated, the average-of-absolute-values calculating unit 54 does not receive generated likelihood data $y_{ai}$ from the demodulation demapping unit 52. Accordingly, processing to obtain the scale value $s_c$ such as described above is not executed.

Also, in a case where the transmission format included in the received control information is the same as the transmission format already received, the control information processing unit 151 operates the scale value changing switch 154 to connect the scale value holding unit 152 and the decoding unit 53. When the scale value changing switch 154 is operated, the scale value holding unit 152 transmits the scale value $s_c$ held therein to the decoding unit 53. The decoding unit 53 receives the scale value $s_c$ transmitted from the scale value holding unit 152, and executes decoding processing such as described above using the received scale value $s_c$.

Figure 21:
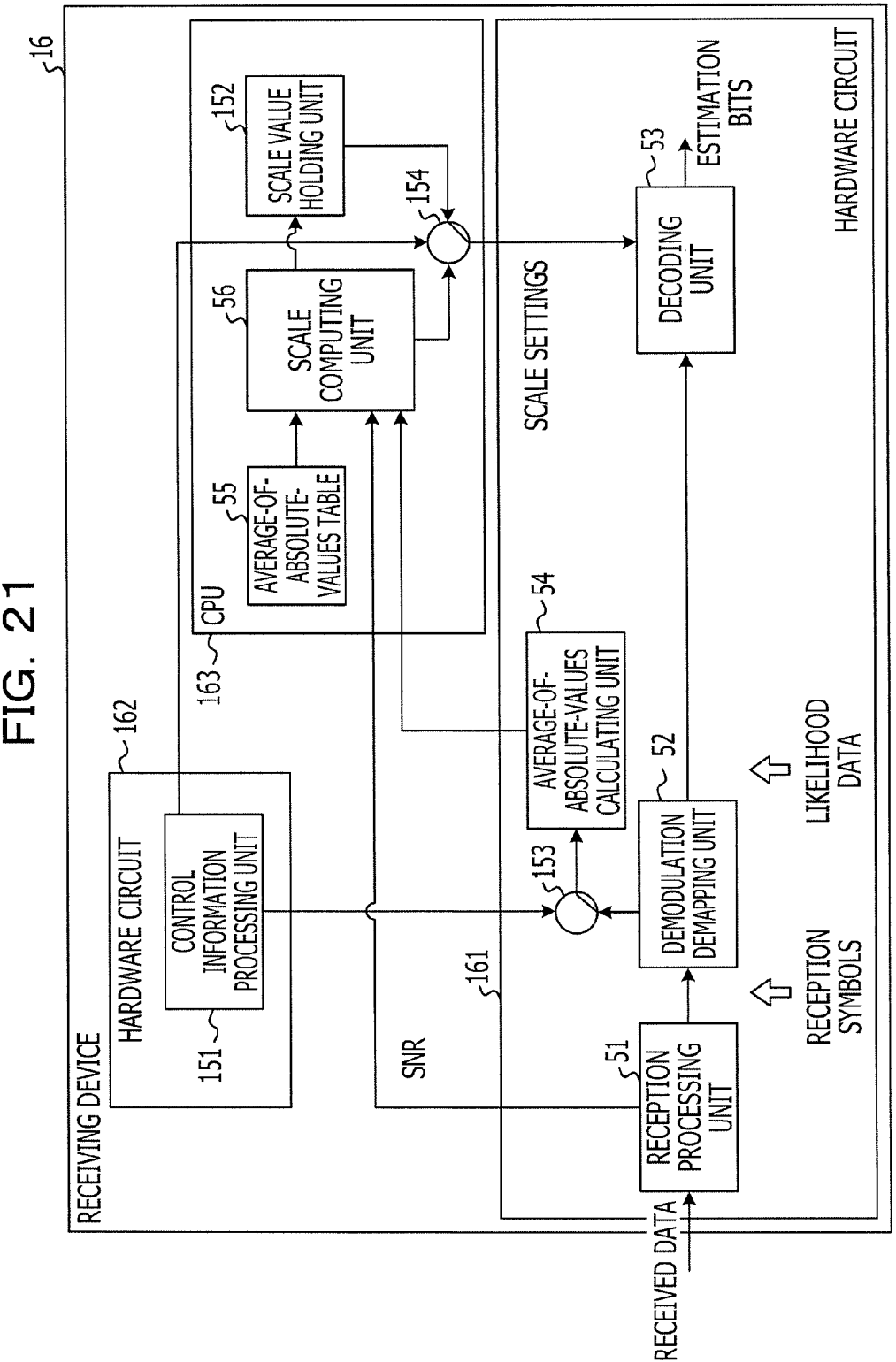
FIG. 21 is an exemplary hardware configuration diagram of a receiving device according to the fifth embodiment.

FIG. 21 is an exemplary hardware configuration diagram of a receiving device according to the fifth embodiment. The example illustrated in FIG. 21 is a configuration where the reception processing unit 51, demodulation demapping unit 52, decoding unit 53, average-of-absolute-values calculating unit 54, and measurement executing switch 153, are implemented by a hardware circuit 161 of a receiving device 16. The control information processing unit 151 is implemented by a separate hardware circuit 162. Also, the average-of-absolute-values table 55, scale computing unit 56, scale value holding unit 152, and scale value changing switch 154 are implemented by a CPU 163. Note that the hardware configuration illustrated in FIG. 21 is but an example, and that the receiving device 15 may be implemented by any device and any hardware circuit which may carry out the reception method according to the fifth embodiment.

Figure 22:
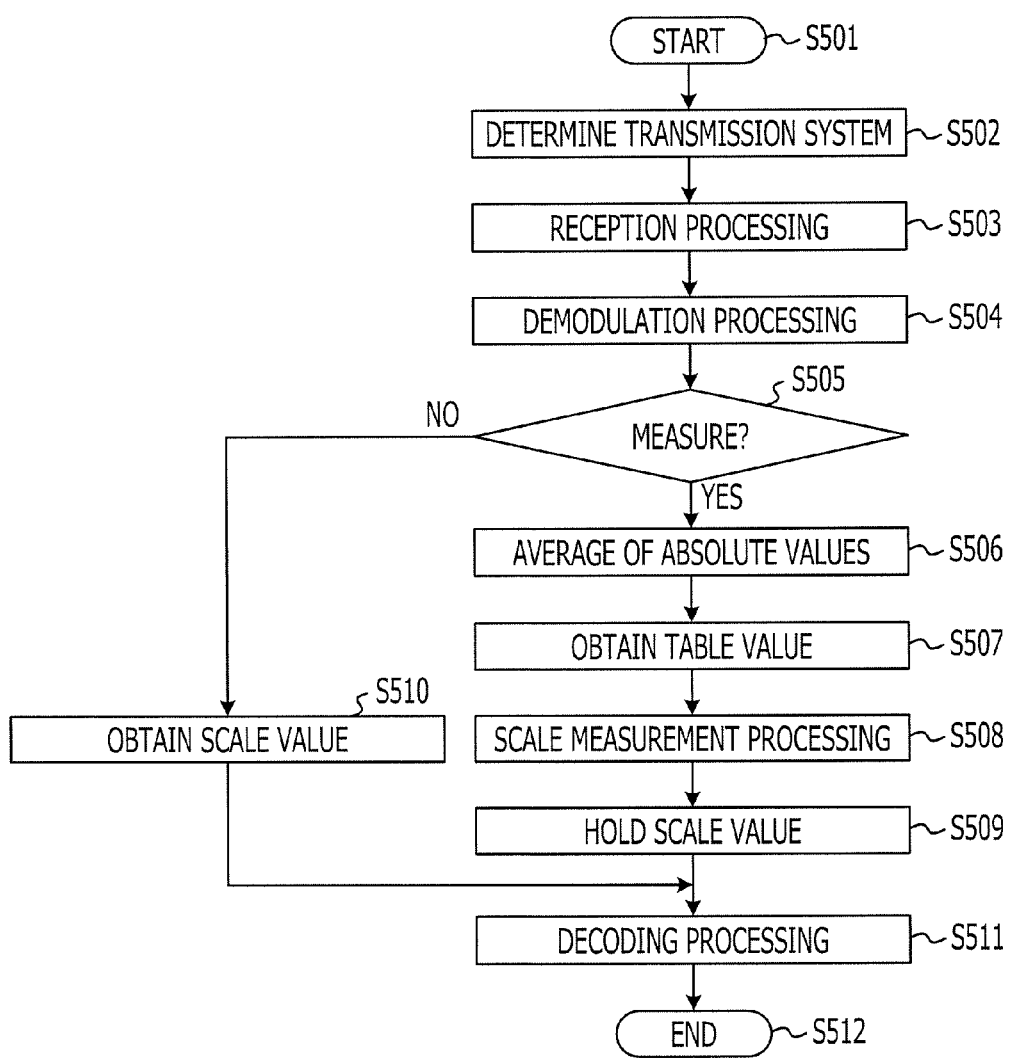
FIG. 22 is an exemplary flowchart of decoding processing by the receiving device according to the fifth embodiment.

An example of the reception data decoding method by the receiving device 15 according to the fifth embodiment will be described with reference to FIG. 22. FIG. 22 is an exemplary flowchart of decoding processing by the receiving device according to the fifth embodiment.

Upon having received control information transmitted from the transmitting device 2 by the reception processing unit 51, a series of decoding processing by the receiving device 15 is started (step S501). The control information processing unit 151 receives control information including the transmission format from the transmitting device 2, and determines whether or not the transmission format included in the received control information is the same as the transmission format already received (step S502).

The reception processing unit 51 performs reception processing on the reception data, and generates reception symbols $r_i$ represented in the format of points in signal space (step S503). The reception processing unit 51 transmits the generated reception symbols $r_i$ to the demodulation demapping unit 52. The reception processing unit 51 also measures SNR as to the received data, and transmits the measured SNR value to the scale computing unit 56.

The demodulation demapping unit 52 receives the reception symbols $r_i$ transmitted from the reception processing unit 51. The demodulation demapping unit 52 then subjects the received reception symbols $r_i$ to demodulating processing in accordance with the transmission format notified from the transmitting device 2, and generates likelihood data $y_{ai}$ (step S504). The demodulation demapping unit 52 transmits the generated likelihood data $y_{ai}$ to the decoding unit 53.

In a case where the transmission format included in the received control information is different from the transmission format already received ("Yes" in step S505), the control information processing unit 151 operates the measurement executing switch 153 so as to connect the demodulation demapping unit 52 and the average-of-absolute-values calculating unit 54. Also, the control information processing unit 151 operates the scale value changing switch 154 so as to connect the scale computing unit 56 and the decoding unit 53. The flow then proceeds to step S506.

Processing the same as that described in steps S104 through S106 is performed in steps S506 through S508, and the scale value $s_c$ is obtained by the scale computing unit 56. The scale computing unit 56 transmits the computed scale value $s_c$ to the scale value holding unit 152 and the decoding unit 53. The scale value holding unit 152 holds the scale value $s_c$ transmitted from the scale computing unit 56 (S509). The flow then proceeds to step S511.

On the other hand, in a case where the transmission format included in the received control information is the same as the transmission format already received ("No" in step S505), the control information processing unit 151 operates the measurement executing switch 153 so as to cut off the connection between the demodulation demapping unit 52 and the average-of-absolute-values calculating unit 54. Also, the control information processing unit 151 operates the scale value changing switch 154 so as to connect the scale value holding unit 152 and the decoding unit 53. The flow then proceeds to step S510.

In step S510, the scale value holding unit 152 transmits the scale value $s_c$ held therein to the decoding unit 53. The flow then proceeds to step S511.

In step S511, the decoding unit 53 receives the likelihood data $y_{ai}$ transmitted from the demodulation demapping unit 52. The decoding unit 53 also receives the scale value $s_c$ from either the scale computing unit 56 or the scale value holding unit 152. The decoding unit 53 then executes the decoding processing the same as that described in step S107.

Upon the decoded bits estimating the information bits transmitted from the transmitting device 2 being obtained by the decoding processing in step S511, the series of decoding processing on the reception data ends (step S512).

Thus, the receiving device 15 according to the fifth embodiment performs decoding processing by converting the implementation scale likelihood data $y_{ai}$ into standard scale, using the scale value $s_c$ obtained regarding a received transport block of which the transmission format has been changed. Accordingly, the receiving device according to the fifth embodiment may yield the same advantages as the receiving devices according to the first through fourth embodiments, and further, costs relating to the processing to obtain the scale value may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has have been described in detail, it should be understood that the various changes, substitutions, and alterations could be made hereto without departing from the spirit and scope of the invention.

What is claimed is:

1. A receiving device comprising:
   a reception circuit configured to receive radio signals transmitted from another device and to derive reception symbols from the radio signals;
   a demodulation circuit configured to generate first likelihood data of the reception symbols based on a transmission format of the reception symbols, the transmission format being selected from transmission formats and including a modulation scheme applied to the reception symbols, the modulation scheme being one of amplitude modulation schemes;
   a processor configured
   to estimate a scale ratio of an implementation scale to a theoretical scale, the implementation scale being a scale of the first likelihood data, the theoretical scale being a scale of second likelihood data of the reception symbols, the second likelihood data being defined by a theory and not depending on an implementation of the receiving device, and
   to generate the second likelihood data based on the first likelihood data and the scale ratio;
   a decoding circuit configured to decode the second likelihood data based on the transmission format;
   a calculating circuit configured to calculate first average of absolute values of the first likelihood data; and
   a memory to which relation data are stored, the relation data indicating correspondences of each of the transmission formats and each of related values, each of the related values being calculated by dividing second average of absolute values of the second likelihood data by signal to noise ratio (SNR) corresponding to each of the transmission formats,
   wherein
   the reception circuit is configured to estimate the SNR of the radio signals,
   the processor is configured to estimate the scale ratio based on the relation data, the first average, and the estimated SNR.

2. The receiving device according to claim 1, wherein
   the transmission format includes a code rate applied to the reception symbols, and
   the relation data includes each of linear functions of each of the rerated values in which the code rate is a variable for each of the transmission formats.

3. The receiving device according to claim 1, wherein
   the processor estimates the scale ratio for a code block that leads code blocks of transport block received from the other device.

4. The receiving device according to claim 1, wherein
   the processor estimates the scale ratio when the transmission format is changed.

5. The receiving device according to claim 1, wherein
   the processor estimates the scale ratio for a bit that leads bits corresponding to the first likelihood data.

6. A receiving method comprising:
   receiving radio signals transmitted from another device and to derive reception symbols from the radio signals;
   generating first likelihood data of the reception symbols based on a transmission format of the reception symbols, the transmission format being selected from transmission formats and including a modulation scheme applied to the reception symbols, the modulation scheme being one of amplitude modulation schemes;
   estimating a scale ratio of an implementation scale to a theoretical scale, the implementation scale being a scale of the first likelihood data, the theoretical scale being a scale of second likelihood data of the reception symbols, the second likelihood data being defined by a theory and not depending on an implementation of the receiving device;
   generating the second likelihood data based on the first likelihood data and the scale ratio;
   decoding the second likelihood data based on the transmission format;
   calculating first average of absolute values of the first likelihood data;
   storing relation data indicating correspondences of each of the transmission formats and each of related values, each of the related values being calculated by dividing second average of absolute values of the second likelihood data by signal to noise ratio (SNR) corresponding to each of the transmission formats; and
   estimating the SNR of the radio signals,
   wherein the estimating the scale ratio is performed based on the relation data, the first average, and the estimated SNR.

7. The receiving method according to claim 6, wherein
the transmission format includes a code rate applied to the reception symbols, and
the relation data includes each of linear functions of each of the rerated values in which the code rate is a variable for each of the transmission formats.

8. The receiving method according to claim 6, wherein
the estimating the scale ratio is performed for a code block that leads code blocks of transport block received from the other device.

9. The receiving method according to claim 6, wherein
the estimating the scale ratio is performed when the transmission format is changed.

10. The receiving method according to claim 6, wherein
the estimating the scale ratio is performed for a bit that leads bits corresponding to the first likelihood data.

* * * * *